United States Patent [19]
Ohkubo et al.

[11] Patent Number: 5,742,827
[45] Date of Patent: Apr. 21, 1998

[54] METHOD OF AUTOMATICALLY FORMING PROGRAM SPECIFICATIONS AND APPARATUS THEREFOR

[75] Inventors: Takao Ohkubo; Toshiaki Yoshino; Shigeki Suguta; Masaaki Noro, all of Kawasaki, Japan

[73] Assignee: Fujitsu Limited, Kawasaki, Japan

[21] Appl. No.: 556,122

[22] Filed: Nov. 9, 1995

Related U.S. Application Data

[63] Continuation of Ser. No. 144,538, Nov. 2, 1993, abandoned.

[30] Foreign Application Priority Data

Nov. 2, 1992 [JP] Japan ................................. 4-294244
Nov. 6, 1992 [JP] Japan ................................. 4-297022

[51] Int. Cl.⁶ ........................................................ G06F 15/00
[52] U.S. Cl. ........................................................ 395/701
[58] Field of Search ........................................ 395/701, 705, 395/707, 708, 752, 759

[56] References Cited

U.S. PATENT DOCUMENTS 4,706,212  11/1987  Toma ............................. 364/DIG. 2

*Primary Examiner*—Thomas M. Heckler
*Attorney, Agent, or Firm*—Staas & Halsey

[57] ABSTRACT

The syntax of an input program is analyzed, variables substituted for the substitution sentences from an interim expression thereof are classified into categories by utilizing rules of naming variables or the data structure, and a set of substitution sentences having variables of the same kind substituted for the destinations is picked up and is converted into a table. The syntax is analyzed to obtain a syntax structure and data attribute, and the data flow is analyzed to obtain data flow information. By using such information, the use of the temporary variables in the program is judged and the temporary variables that can be erased are erased. The table conversion and the interim expression from which the temporary variables are erased are replaced by the description of a natural language to form specifications.

19 Claims, 36 Drawing Sheets

Fig.4

```
IDENTIFICATION      DIVISION.
PROGRAM-ID.     AAA.
ENVIRONMENT         DIVISION. (OMITTED)
DATA                DIVISION. (OMITTED)
CONSTANT            SECTION.  (OMITTED)
LINKAGE             SECTION.  (OMITTED)
PROCEDURE           DIVISION.

MAIN                SECTION.
    IF  MW01KB  =  '1'  OR  MW01KB  =  '2'
    THEN
        CONTINUE
    ELSE
        GO  TO  ERROR-010
    END-IF.
    PERFORM  HENSHU.
    IF  MW01KB  =  '1'
    THEN
        CALL  'AWOG'
        IF  ADKCOD  =  X'00'
        THEN
            CONTINUE
        ELSE
            GO  TO  ERROR-020
        END-IF
    ELSE
        CONTINUE
    END-IF.
    MOVE  X'00'  TO  MW0COD.
    GOBACK
MAIN-E.
    EXIT.
```

```
HENSHU      SECTION.
   MOVE   XHIHII              TO   XLWCDT.
   MOVE   'AA'                TO   XLWUBU.
   MOVE   ZERO                TO   XLWSTC.
   MOVE   ZERO                TO   XLWTNO.
   MOVE   LOW-VALUE           TO   XLWKBN.
   MOVE   XWSBUH              TO   XLWKFG.
   MOVE   XTWHMD  TO  XLWHMD.
   IF  ( AIFQNO  =    00102 )
         AND  (  MWOIKB   =   '1'  )
         AND  (  MQEBUN       '9'  )
   THEN
     MOVE   B'1'                TO   XLWNMD
   ELSE
     MOVE   XTWNMD   TO   XLWNMD
   END-IF.
   IF  ( AIFQNO  =    00101 )
         AND  (  MWOIKB   =   '1'  )
         AND  (  MQDBUN   =   '9'  )
   THEN
     MOVE   B'1'                TO   XLWOMD
   ELSE
     MOVE   XTWCMD   TO   XLWOMD
   END-IF.
   IF  ( AIFQNO  =    00103 )
         AND  (  MWOIKB   =   '1'  )
         AND  (  MQFBUN   =   '9'  )
   THEN
     MOVE   B'1'                TO   XLWODE
   ELSE
     MOVE   XTWODE   TO   XLWODE
   END-IF.
   MOVE   AIFTRI              TO   XLWIMD.
   MOVE   AIFKES              TO   XLWKMD.
   MOVE   AIFKAE              TO   XLWKMD.
   MOVE   AIFUGO              TO   XLWGMD.
   MOVE   AIFIWA              TO   XLWAMD.

```
(setq *cobol-program*       (*program* 29 AAA
(*data-definition*    (OMITTED)
(*constant-section*   (OMITTED)
(*link-section*       (OMITTED)
(*procedure* 194 (*using*
(*section* 199 MAIN
(*if* (nil 200 205 nil)
(*or* (*=* MMOIKB (*string* "1")) (*=* MMOIKB (*string* "2")))
(*then* (*continue* (nil 202 202 nil))
) (*else* (*goto* (nil 204 205 nil) ERROR-010)))
(*perform* (nil 206 206 nil) HENSHU nil nil) (*if* (nil 207 218 nil)
(*=* MMOIKB (*string* "1" ))
(*then* (*call* (nil 209 210 nil) (*string* "AWOG" ) nil nil)
(*if* (nil 210 215 nil)
(*=* ADKCOD (*hex-string* "00" ))
(*then* (*continue* (nil 212 212 nil))
) (*else* (*goto* (nil 214 215 nil) ERROR-020)))
) (*else* (*continue* (nil 217 217 nil))
))
(*assign* (nil 219 219 nil) (*from* (*hex-string* "00"))
(*to* MMOCOD nil))
(*goback* (nil 220 220 nil)) (*label* (nil 221 221 nil) MAIN-E)
(*exit* (nil 222 222 nil))))
```

Fig.7

```
(*section* 228 HENSHU
(*assign* (nil 233 233 nil)    (*from*    XHIHI1) (*to* XLWCDT nil) nil)
(*assign* (nil 235 235 nil)    (*from*    (*string* "AA" )) (*to* XLWUBU nil)
(*assign* (nil 237 237 nil)    (*from*    *zero*) (*to* XLWSTC nil) nil)
(*assign* (nil 238 238 nil)    (*from*    *zero*) (*to* XLWTNO nil) nil)
(*assign* (nil 240 240 nil)    (*from*    *low-value*) (*to* XLWKBN nil) nil)
(*assign* (nil 241 241 nil)    (*from*    XWSBUH) (*to* XLWKFG nil) nil)
(*assign* (nil 243 243 nil)    (*from*    XTWHMD) (*to* XLWHMD nil) nil)
(*if* (nil 244 251 nil)
  (*and* (*parenthesis* (*=* AIFQNO 00102))
    (*parenthesis* (*=* MWOIKB (*string* "1" ))))
    (*parenthesis* (*=* MQEBUN (*string* "9" ))))
  (*then* (*assign* (nil 248 249 nil) (*from* (*binary-string* "1" ))
    (*to* XLWNMD nil nil)))
  (*else* (*assign* (nil 250 251 nil) (*from* XTWNMD)
    (*to* XLWNMD nil) nil))
))
(*if* (nil 252 259 nil)
  (*and* (*parenthesis* (*=* AIFQNO 00101))
    (*parenthesis* (*=* MWOIKB (*string* "1" ))))
    (*parenthesis* (*=* MQDBUN (*string* "9" ))))
  (*then* (*assign* (nil 256 257 nil) (*from* (*binary-string* "1" ))
    (*to* XLWOMD nil) nil)))
```

Fig. 8

```
(*else* (*assign* (nil 258 259 nil) (*from* XTWOMD)
(*to* XLWOMD nil) nil)
))
(*if* (nil 260 267 nil)
(*and* (*and* (*parenthesis* (*=* AIFQNO 00103))
(*parenthesis* (*=* MMOIKB (*string* "1" )))
(*parenthesis* (*=* MQFBUN (*string* "g" )))))
(*then* (*assign* (nil 264 265 nil) (*from* (*binary-string* "1" ))
(*to* XLWODE nil) nil))
(*else* (*assign* (nil 266 267 nil) (*from* XTWODE)
(*to* XLWODE nil) nil)
))
(*assign* (nil 268 268 nil) (*from* AIFTRI) (*to* XLWIMD nil) nil)
(*assign* (nil 269 269 nil) (*from* AIFKES) (*to* XLWKMD nil) nil)
(*assign* (nil 270 270 nil) (*from* AIFKAE) (*to* XLWKMD nil) nil)
(*assign* (nil 271 271 nil) (*from* AIFUGO) (*to* XLWGMD nil) nil)
(*assign* (nil 272 272 nil) (*from* AIFIWA) (*to* XLWAMD nil) nil)
```

Fig.9(a)

```
MOVE WK1 TO XXXV1
MOVE WK2 TO YYYV2
MOVE WK3 TO YYYV3
MOVE WK4 TO YYYV4
MOVE WK5 TO ZZZV5
MOVE WK6 TO XXXV6
```

Fig.9(b)

```
(*assign* (*from* WK1)  (*to* XXXV1))
(*assign* (*from* WK2)  (*to* YYYV1))
(*assign* (*from* WK3)  (*to* YYYV2))
(*assign* (*from* WK4)  (*to* YYYV4))
(*assign* (*from* WK5)  (*to* ZZZV1))
(*assign* (*from* WK6)  (*to* XXXV2))
```

Fig.9(c)

SET WORK 1 TO VARIABLE X1
SET VALUES TO THE FOLLOWING REGIONS

| ITEM | VALUE |
|---|---|
| VARIABLE Y1 | WORK 2 |
| VARIABLE Y2 | WORK 3 |
| VARIABLE Y3 | WORK 4 |

SET WORK 5 TO VARIABLE Z1
SET WORK 1 TO VARIABLE X2

Fig.11(a)

```
IF cond-A THEN
     MOVE WK1 TO YYYV1
     MOVE WK2 TO YYYV2
  ELSE
     MOVE WK3 TO YYYV1
     MOVE WK4 TO YYYV3
END-IF
```

Fig.11(b)

```
(*if* cond-A (*then* (*assign* (*from* WK1) (*to* YYYV1))
                     (*assign* (*from* WK2) (*to* YYYV2)))
              (*else* (*assign* (*from* WK3) (*to* YYYV1))
                      (*assign* (*from* WK4) (*to* YYYV3)))
```

Fig.11(c)

SET VALUES TO THE FOLLOWING REGIONS

| ITEM | VALUE | |
|---|---|---|
| VARIABLE Y1 | IF cond-A<br>IN OTHER CASES | WORK 1<br>WORK 3 |
| VARIABLE Y2 | IF cond-A | WORK 2 |
| VARIABLE Y3 | IF NOT cond-A | WORK 4 |

Fig.13

```
MOVE WK1 TO XXXV1
MOVE WK2 TO YYYV1
MOVE WK3 TO YYYV2
MOVE WK4 TO YYYV3
IF cond-A THEN
            MOVE WK5 TO YYYV4
            MOVE WK6 TO YYYV5
    ELSE
            MOVE WK7 TO YYYV4
            MOVE WK8 TO YYYV5
END-IF
IF cond-B THEN
            MOVE WK9 TO YYYV6
            MOVE WK10 TO YYYV7
    ELSE
            MOVE WK11 TO YYYV7
            MOVE WK10 TO YYYV8
END-IF
MOVE WK13 TO YYYV9
MOVE WK14 TO ZZZV1
```

Fig.14

```
(*assign* (*from* WK1)  (*to* XXXV1))
(*assign* (*from* WK2)  (*to* YYYV1))
(*assign* (*from* WK3)  (*to* YYYV2))
(*assign* (*from* WK4)  (*to* YYYV3))
(*if* cond-A (*then* (*assign* (*from* WK5)  (*to* YYYV4))
                     (*assign* (*from* WK6) + (*to* YYYV5)))
             (*else* (*assign* (*from* WK7)  (*to* YYYV4))
                     (*assign* (*from* WK8)  (*to* YYYV5))))
(*if* cond-B (*then* (*assign* (*from* WK9)  (*to* YYYV6))
                     (*assign* (*from* WK10) (*to* YYYV7))
                     (*assign* (*from* WK11) (*to* YYYV7)))
             (*else* (*assign* (*from* WK12) (*to* YYYV8))))
(*assign* (*from* WK13) (*to* YYYV9))
(*assign* (*from* WK14) (*to* ZZZV1))
```

Fig.15

SET WORK 1 TO VARIABLE X1
SET VALUES TO THE FOLLOWING REGIONS

| ITEM | VALUE | |
|---|---|---|
| VARIABLE Y1 | | WORK 2 |
| VARIABLE Y2 | | WORK 3 |
| VARIABLE Y3 | | WORK 4 |
| VARIABLE Y4 | IF cond-A<br>IN OTHER CASES | WORK 5<br>WORK 7 |
| VARIABLE Y5 | IF cond-A<br>IN OTHER CASES | WORK 6<br>WORK 8 |
| VARIABLE Y6 | IF cond-B<br>IN OTHER CASES | WORK 9<br>WORK 11 |
| VARIABLE Y7 | IF cond-B | WORK 10 |
| VARIABLE Y8 | IF NOT cond-B | WORK 12 |
| VARIABLE Y9 | | WORK 13 |

SET WORK 14 TO VARIABLE Z1

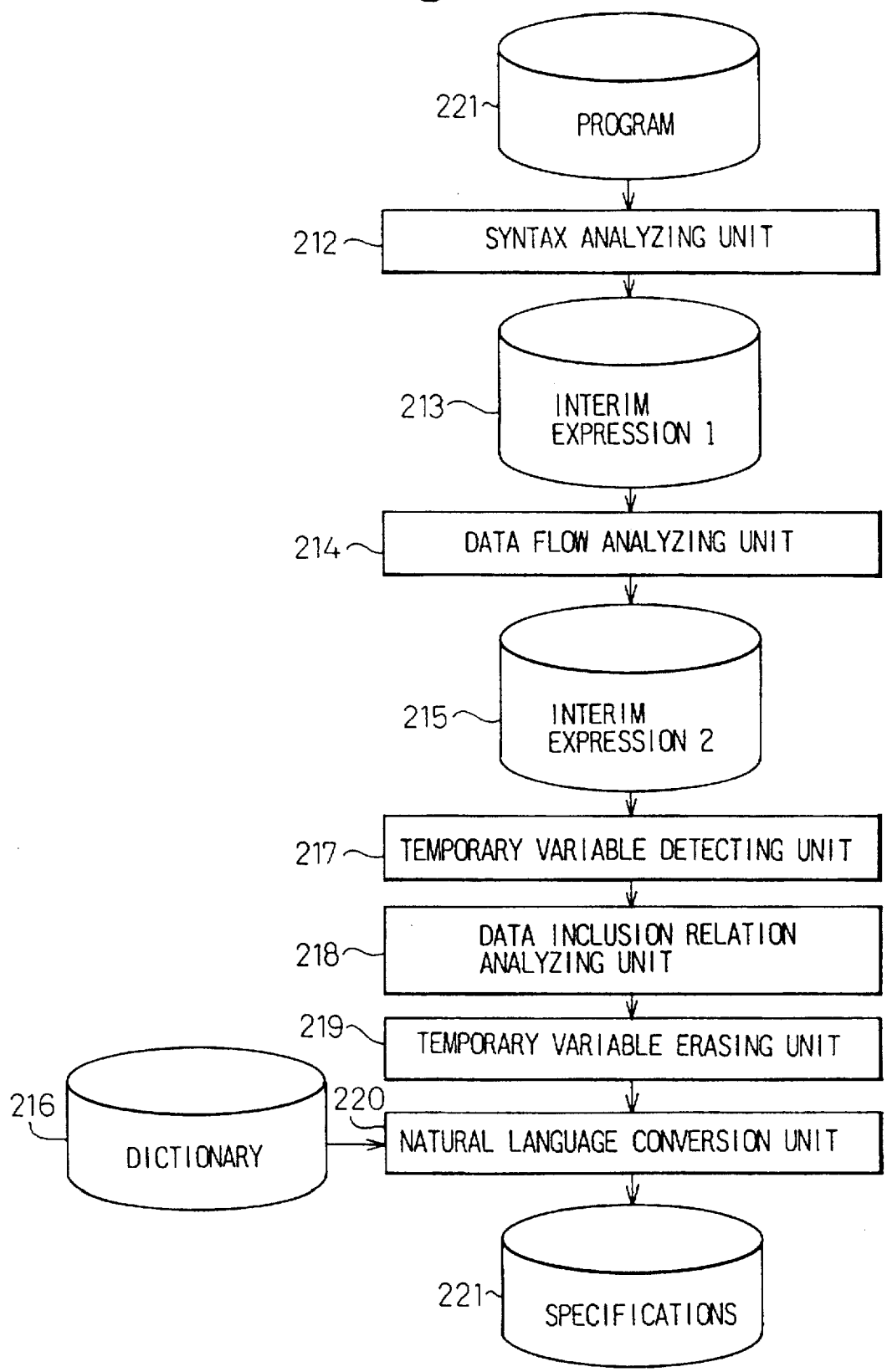

SYMBOL TABLE

| NAMES OF VARIABLES |
| TYPES |
| INITIAL VALUES |
| POINTER TO PARENT |
| POINTER TO ELDEST SON |
| POINTER TO BROTHER |
| POINTER TO RE-DEFINITION |
| POINTER TO THE ONE BEING RE-DEFINED |
| INFORMATION OF SETTING PLACES |
| INFORMATION OF REFERENCE PLACES |
| INFORMATION OF DATA INCLUSION RELATION |

SYNTAX TREE

Fig.19

BASIC BLOCK INFORMATION

| BLOCK No. |
| --- |
| POINTER TO SYNTAX TREE |
| LIST OF SUCCEEDING BLOCKS |
| LIST OF PRECEEDING BLOCKS |
| VARIABLE REFERENCE INFORMATON |
| VARIABLE SET INFORMATION |

Fig.21

```
01  ZPCDIN         PICTURE  X(5)
01  ZPCDOUT        PICTURE  X(6)
01  TMP-ZPCD1
    02  TMP-ZPCD11    PICTURE  X(3)
    02  TMP-ZPCD12    PICTURE  X(2)
01  TMP-ZPCD2
    02  TMP-ZPCD21    PICTURE  X(3)
    02  FILLER        PICTURE  X(3)  VALUE SPACE
01  TMP-ZPCD3
    02  TMP-ZPCD31    PICTURE  X(3)
    02  FILLER        PICTURE  X(1)  VALUE
    02  TMP-ZPCD33    PICTURE  X(2)

....

MOVE  ZPCDIN  TO  TMP-ZPCD1

IF  TMP-ZPCD12 = SPACE
   THEN
       MOVE  TMP-ZPCD11  TO  TMP-ZPCD21
       MOVE  TMP-ZPCD2   TO  ZPCDOUT
   ELSE
       MOVE  TMP-ZPCD11  TO  TMP-ZPCD31
       MOVE  TMP-ZPCD12  TO  TMP-ZPCD33
       MOVE  TMP-ZPCD3   TO  ZPCDOUT
END-IF
```

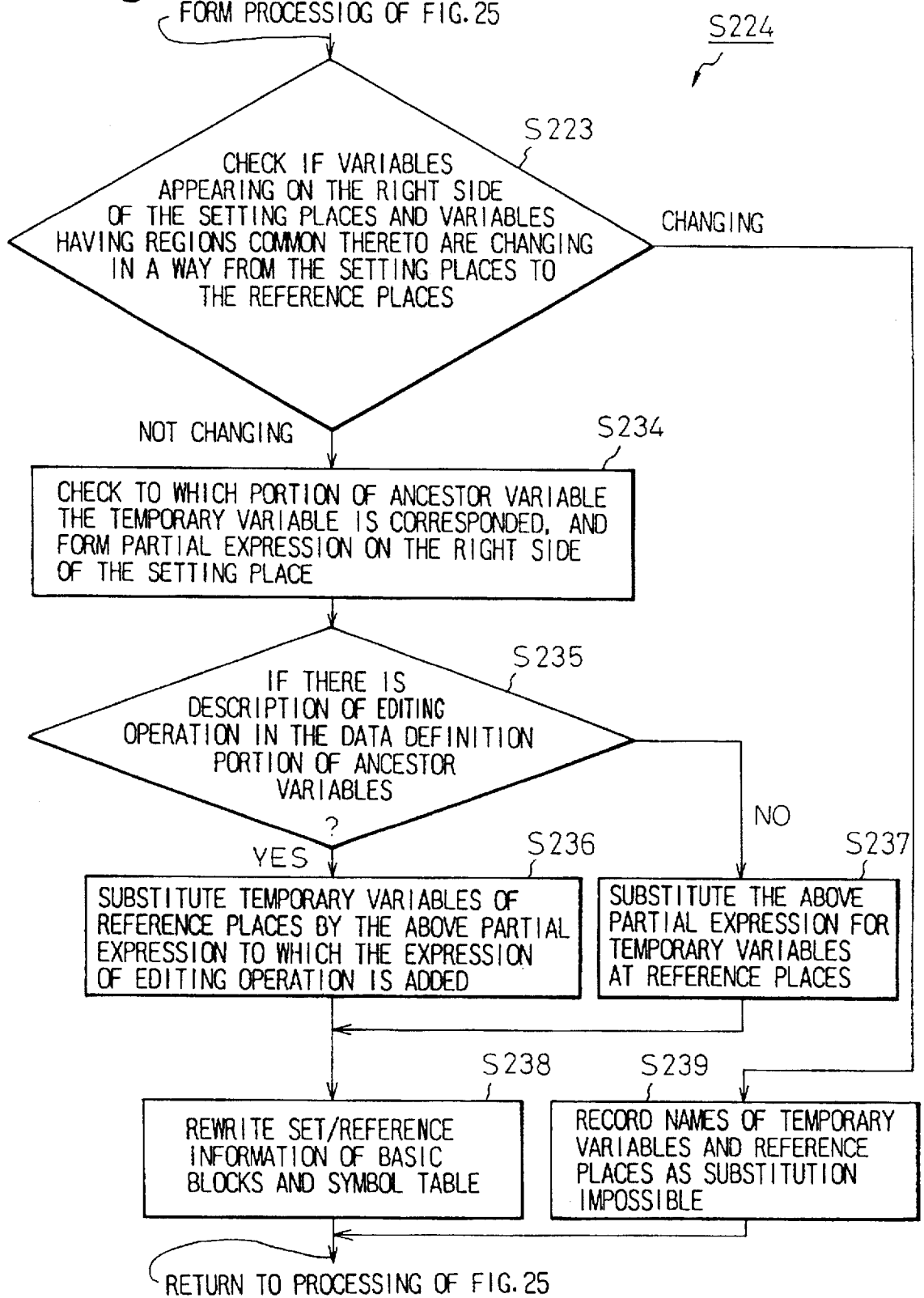

Fig. 34

WHEN THE LOWER TWO DIGITS OF INPUT ZIP CODE ARE BLANK

SET UPPER 3 DIGITS OF INPUT ZIP CODE TO UPPER 3 DIGITS OF OUTPUT ZIP CODE.
SET BLANK TO LOWER 3 DIGITS OF OUTPUT ZIP CODE.

IN OTHER CASES

SET UPPER 3 DIGITS OF INPUT ZIP CODE TO UPPER 3 DIGITS OF OUTPUT ZIP CODE.
SET "-" TO FOURTH DIGIT OF OUTPUT ZIP CODE.
SET LOWER 2 DIGITS OF INPUT ZIP CODE TO LOWER 2 DIGITS OF OUTPUT ZIP CODE.

METHOD OF AUTOMATICALLY FORMING PROGRAM SPECIFICATIONS AND APPARATUS THEREFOR

This application is continuation of application Ser. No. 08/144,538, filed Nov. 2, 1993, now abandoned.

BACKGROUND OF THE INVENTION

1. Field of the Invention

The present invention relates to a method of automatically forming program specifications from an existing program, and particularly to a method of automatically forming program specifications having a function of converting variables used in the existing program into a table to change them into a natural language expression and of erasing temporary variables that are introduced at the time of writing a program, and to an apparatus therefor.

2. Description of the Prior Art

In order to facilitate maintenance work on existing programs, it has been urged to electronically manage the specifications and to facilitate the reference and retrieval thereof. In many cases, however, the specifications of existing programs are written by hand requiring laborious work. In order to prepare specifications that can be electronically managed to reduce the amount of work, a function is necessary which picks up the specifications from the program and automatically forms the specification.

A method has heretofore been known for automatically forming specifications from an existing program. According to a conventional method of automatically forming program specifications, however, the program is changed into a natural language in nearly a one-to-one manner. Even when the variables used in the program are to be converted into the form of a table, the conventional method simply forms a conversion table of data declaration and a decision table. However, there has not been known any method which gives attention to the destinations for where the variables are substituted and which converts the substitutions of the same kind into a table at one time. Moreover, a function has not been provided for deleting temporary variables that are temporarily used in a program only that is introduced by a programmer at the time of preparing a program.

In the former case, the variables are separately expressed despite the process being executed for substituting those having the same meaning leaving a problem in that the relationships among the variables are not comprehensible. In the latter case, on the other hand, the finished specification contains the description of temporary variables that should not appear in the specification; i.e., the specification is not prepared in a complete form.

SUMMARY OF THE INVENTION

The present invention was accomplished in view of the problems inherent in the above-mentioned prior art, and its object is to provide a method of automatically forming program specifications that can be easily comprehended by summarizing the substitution processings which are strongly related to each other into one table at the time of forming the specifications, and to an apparatus therefor.

It is further an object of the present invention to provide a method of automatically forming program specifications maintaining higher quality than that of the conventional counterparts by erasing temporary variables that should not appear in the real specifications, and an apparatus therefor.

According to a first invention, there is provided a method of automatically forming program specifications by converting a program into a natural language, wherein the variables are classified into categories by utilizing rules of naming variables or the data structure of variables, a set of substitution sentences is picked up having variables of the same kind which are substituted for the destinations, and the picked-up substitution sentences are converted into a table to thereby automatically form a specification.

There is further provided a method of automatically forming program specifications by converting a program into a natural language, wherein the variables are classified into categories by utilizing the rules of naming variables or the data structure of variables, a set of substitution sentences is picked up having variables of the same kind which are substituted for the destinations out of rows of substitution sentences that have been divided depending upon conditional branching, the rows of substitution sentences are classified depending upon the conditions and are converted into a table thereby to automatically form a specification.

Moreover, there is provided a method of automatically forming program specifications by converting a program into a natural language, wherein the variables are classified into categories by utilizing the rules of naming variables or the data structure of variables, a set of substitution sentences is picked up having variables of the same kind which are substituted for the destinations and is converted into a first table, a set of substitution sentences is picked up having variables of the same kind which are substituted for the destinations out of rows of substitution sentences that have been divided depending upon the conditional branching and, the rows of substitution sentences are classified and are converted into a second table depending upon said condition, and when variables corresponding to those substituted for the destinations are of the same kind in the consecutive first and second tables, the first table and second table are synthesized into a single table to thereby automatically form a specification. There is further provided an apparatus for automatically forming program specifications by processing the above-mentioned steps.

According to a second invention, there is provided a method of automatically forming program specifications by analyzing a program to form syntax structure information and data attribute information, analyzing the data flow of the program to form data flow information, and forming the specifications from a given program based on said syntax structure information, data attribute information and data flow information, wherein an inclusion relation of data is analyzed based on the data attribute information to form data inclusion relation information, temporary variables included in the program are detected, the role of the temporary variables that are detected to be included in the program is judged based on said syntax structure information, data attribute information, data flow information and data inclusion relation information, and the temporary variables are erased when they are used only for improving efficiency such as holding interim results of computation, when they are used for type conversion by the re-definition of data, when they are used for the division of data based on a parental relation of data structure, or when they are used for the synthesis of data based on the parental relation of data structure. There is further provided an apparatus for automatically forming program specifications for putting the above-mentioned method into practice

BRIEF DESCRIPTION OF THE DRAWINGS

The present invention will be more clearly understood from the description as set forth below with reference to the accompanying drawings in which:

FIG. 4 is a diagram (1) illustrating an input program described in COBOL;

FIG. 5 is a diagram (2) illustrating an input program described in COBOL;

FIG. 6 is a diagram (1) illustrating an interim expression formed by a sentence analyzing unit;

FIG. 7 is a diagram (2) illustrating an interim expression formed by the sentence analyzing unit;

FIG. 8 is a diagram (3) illustrating an interim expression formed by the sentence analyzing unit;

FIG. 9(a) is a diagram illustrating a COBOL program before the consecutive substitution sentence rows are converted into a table;

FIG. 9(b) is a diagram illustrating an interim expression for converting consecutive rows of substitution sentences into a table;

FIG. 9(c) is a diagram showing an example in which the consecutive rows of substitution sentences are converted into a table;

FIG. 11(a) is a diagram of a COBOL program before a substitution sentence in a conditional branch sentence is converted into a table;

FIG. 11(b) is a diagram illustrating an interim expression for converting the substitution sentence in the conditional branch sentence into a table;

FIG. 11(c) is a diagram showing an example in which the substitution sentence in the conditional branch sentence is converted into a table;

FIG. 13 is a diagram (1) showing an example in which consecutive tables are converted into a table;

FIG. 14 is a diagram (2) showing an example in which consecutive tables are converted into a table;

FIG. 15 is a diagram (3) showing an example in which consecutive tables are converted into a table;

FIG. 17 is a diagram of the fundamental constitution of the apparatus for automatically forming program specifications according to the second embodiment of the present invention;

FIG. 19 is a diagram (1) showing a relationship between a basic block and the syntax tree;

FIG. 21 is a diagram of a program for explaining an embodiment;

FIG. 27 is a flowchart illustrating the processing of the case of ancestors (or the case of dividing rows of characters);

FIG. 34 is a diagram illustrating a specification formed by the present invention.

DESCRIPTION OF THE PREFERRED EMBODIMENTS

Figure 1:
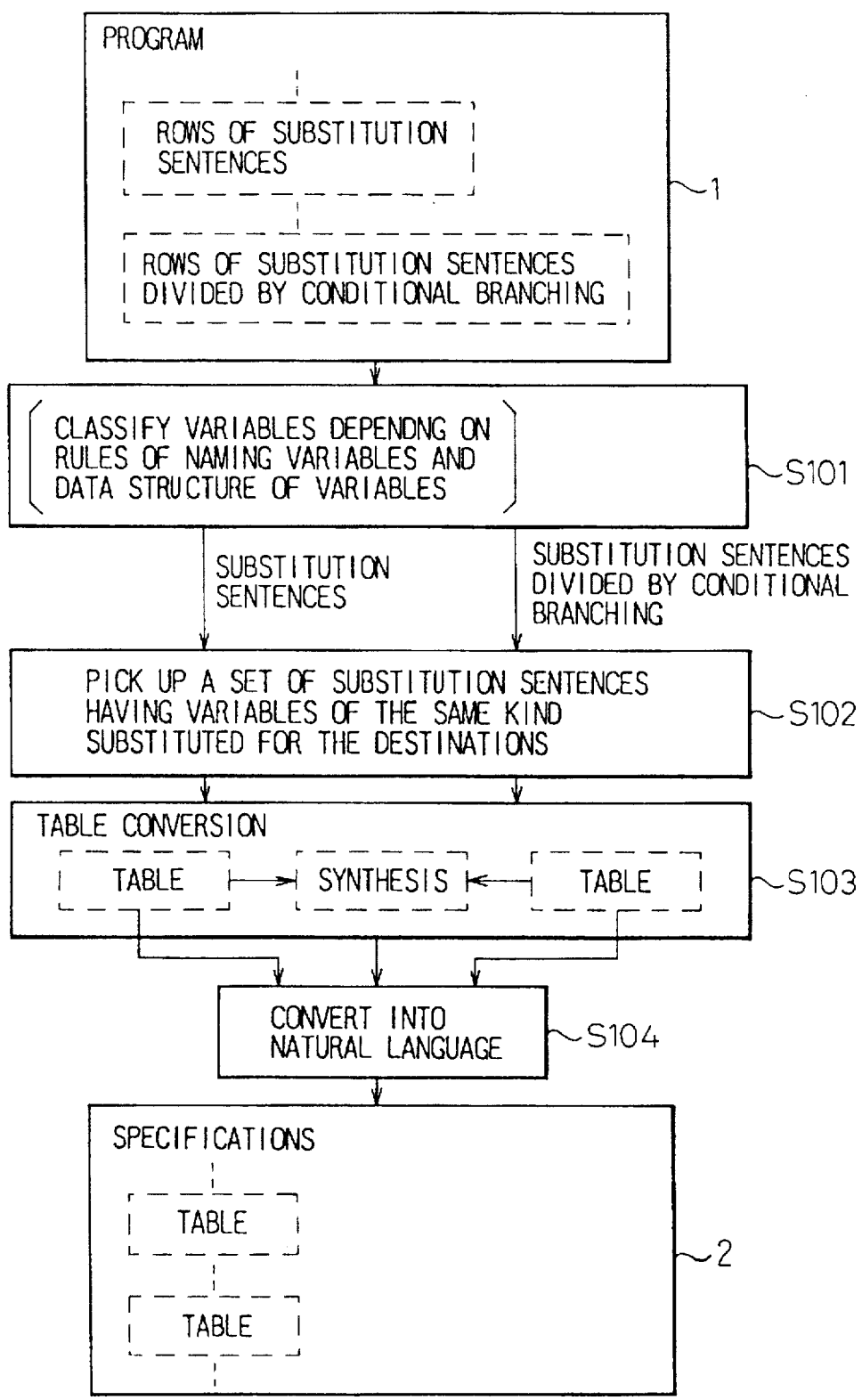
FIG. 1 is a diagram illustrating the principle of a first embodiment of the present invention.

FIG. 1 is a diagram illustrating the principle according to a first embodiment of the present invention, wherein reference numeral 1 denotes an input program, and 2 denotes a specification formed according to the present invention.

According to the present invention which automatically forms the specification 2 by converting the program 1 into a natural language as shown in FIG. 1, the variables are classified into categories by utilizing the rules or naming variables or the data structure of variables (S101), and a set of substitution sentences is picked up having variables of the same kind which are substituted for the destinations (S102). Then, the substitution sentences picked up by using natural language are converted into a table (S103, S104) to automatically form the specification 2.

According to the present invention as shown in FIG. 1, furthermore, the variables are classified into categories by utilizing the rules of naming variables or the data structure of variables, a set of substitution sentences are picked up having variables of the same kind which are substituted for the destinations out of the rows of substitution sentences that have been divided depending upon the conditional branching, and the rows of substitution sentences are classified depending upon the branching conditions and are converted into a table.

According to the present invention, furthermore, the variables are classified into categories by utilizing the rules of naming variables or the data structure of variables, and a set of substitution sentences is picked up having variables of the same kind which are substituted for the destinations and are converted into a first table. Then, a set of substitution sentences is picked up having variables of the same kind which are substituted for the destinations out of rows of substitution sentences that have been divided depending upon the conditional branching and, the rows of substitution sentences are classified depending upon the branching conditions and are converted into a second table. Then, when variables corresponding to those substituted for the destinations are of the same kind in the consecutive first and second tables, said first table and said second table are synthesized into a single table to thereby automatically form a specification 2.

That is, according to the present invention, variables substituted for the destinations of substitution sentences of the program are classified into categories by utilizing the rules of naming variables or the data structure thereof, to pick up a set of substitution sentences having variables of the same kind which are substituted for the destinations. Then, the variables that can be converted into a table are converted into a table pattern for every variable having a strong relationship. The substitution sentences that have been divided depending upon the conditional branching are classified depending upon the branching conditions and are converted into a table. Then, when the variables corresponding to those of the destinations in the thus converted consecutive tables are of the same kind, these tables are synthesized into one table. The substitution sentences converted into a table are converted into a natural language such as Japanese, and a specification is prepared having a table in which are classified the rows of substitution sentences depending upon the variables substituted for the destinations. It is thus made possible to convert substitution sentences having variables of the same kind substituted for the destinations into one table and, hence, to write specifications that are easier to understand.

Figure 3:
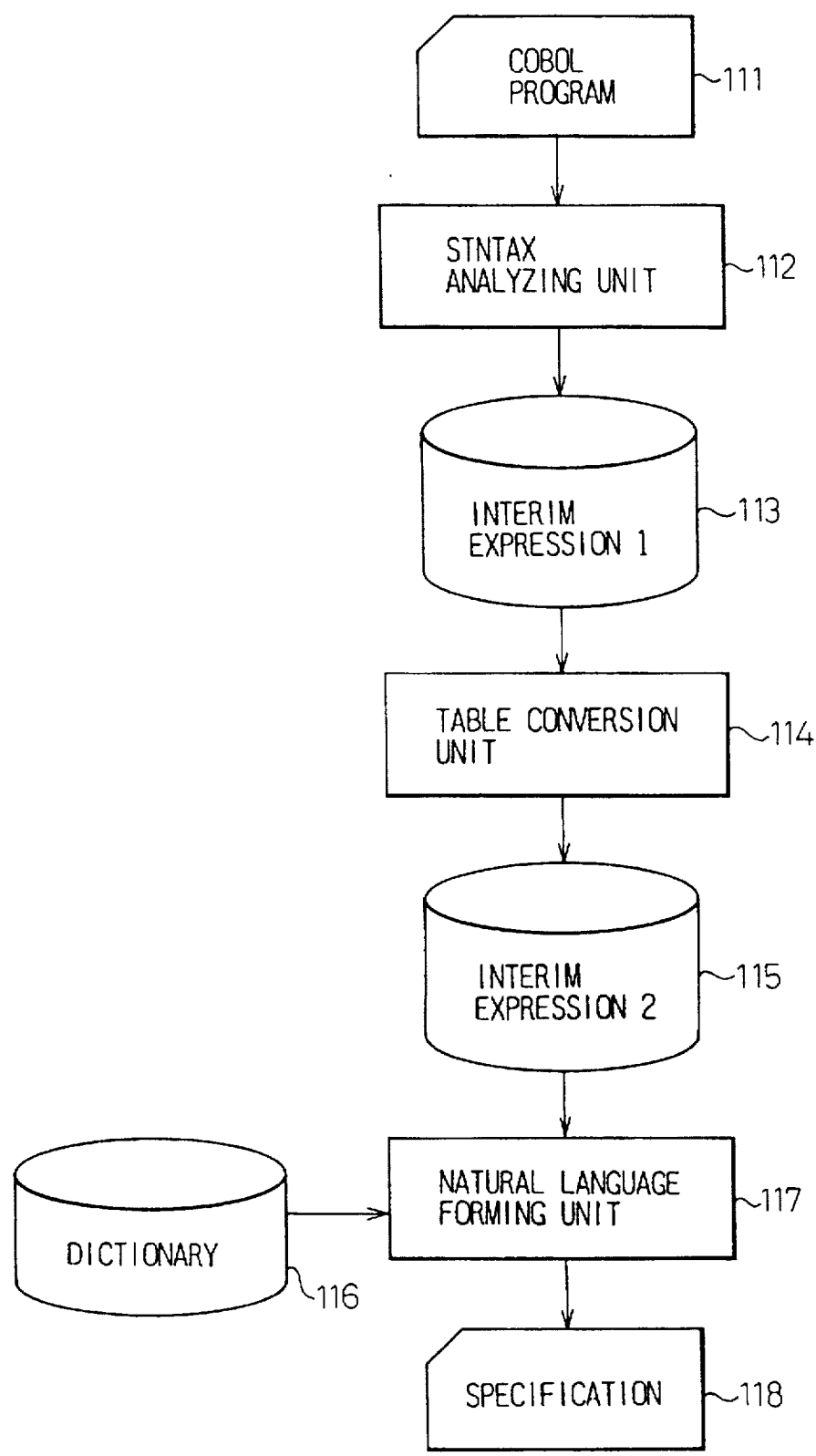
FIG. 3 is a diagram illustrating the fundamental constitution of an apparatus for automatically forming program specifications according to the first embodiment of the present invention.

FIG. 3 is a diagram illustrating the fundamental constitution of the apparatus for automatically forming program specifications according to the first embodiment of the present invention.

In FIG. 3, a program 111 is input using a language such as COBOL or the like. A syntax analyzing unit 112 analyzes the program 111 to form an interim expression which expresses the syntax structure and the data structure. An interim expression unit (1) 113 has an interim expression formed by the syntax analyzing unit 112. A table conversion unit 114 converts part of the interim expression unit (1) 113 into a table pattern. An interim expression unit (2) 115 has an interim expression that is converted into the table pattern. A dictionary 116 stores names representing the meanings that correspond to identifiers in the program. A natural language forming unit 117 substitutes the interim expression in the interim expression unit (2) for the natural language and a table expressed by the natural language based upon information of the dictionary 116. A specification 118 is one written in accordance with the present invention.

FIGS. 4 and 5 illustrate examples of the input program 111 described in COBOL.

In this program, the substitution sentence reading "MOVE—" is a portion that is to be converted into a table in this embodiment. Referring, for example, to second line reading "MOVE XHIHII TO XLWCDT" in the program of FIG. 5, a variable "XLWCDT" which is substituted for the destination is picked up, and the variable and the value thereof are converted at one time into a table for each of the categories (kinds).

Here, whether the categories of variables which are substituted for the destinations are of the same kind or not, is determined by, for example, the methods described below.

(1) A method which utilizes information of rules for naming variables.

Rules for naming of variables have often been classified depending upon the businesses and applications. For instance, the kind of a variable is expressed by the first three characters (e.g., a variable starting with three characters of "TMP—" corresponds to a "temporary variable").

In this case, therefore, the kind of the variable can be determined relying upon the first three characters of the name of the variable.

(2) A method which utilizes information of data structure of a variable.

In naming a variable, a hierarchical structure is employed in which a least significant variable in the variable "XXXV1" is expressed as "XXXV11", "XXXV12", —and a least significant variable of the variable "XXXV11" is expressed as "XXXV111" to impart the name of a structure that corresponds to the kind and hierarchy. Thus, when the kinds of variables are classified depending upon the data structure, the category of the variable can be judged by looking at the structure of the variable.

In FIG. 3, the syntax analyzing unit 112 analyzes, for instance, the program 111 shown in FIGS. 4 and 5 and forms an interim expression of the interim expression unit (1) 113 which expresses the syntax structure and the data structure thereof.

FIGS. 6 to 8 illustrate an interim expression of the interim expression unit (1) 113 formed by the syntax analyzing unit 112, which is the case of when an interim expression described in LISP is formed from the program described in COBOL shown in FIGS. 4 and 5. The interim expression formed by the syntax analyzing unit 112 shown in FIGS. 6 to 8 is given to the table conversion unit 114 which judges the variable category of the substitution sentence relying on the judging method of (1) or (2) mentioned above, and converts the variables that can be converted into a table into a table pattern for every strongly related variable, in order to form an interim expression in the interim expression unit (2) 115.

The natural language forming unit 117 converts the interim expression in the interim expression unit (2) 115 into a natural language (e.g., Japanese, etc.) by using names of variables stored in the dictionary 16, in order to form a final specification 118.

FIGS. 9(a) and 9(b) illustrate concrete examples in which consecutive rows of substitution sentences are converted into a table.

FIG. 9(a) shows a COBOL program that is to be converted, FIG. 9(b) shows an interim expression formed by the syntax analyzing unit 12, and FIG. 9(c) shows the result of when the consecutively input substitution sentences including variables "YYYV1" to "YYYV4" are converted into a table. In forming a specification 118 expressed by a natural language shown in FIG. 9(c), the natural language forming unit 117 converts the variables into a natural language by making reference to, for example, the following information stored in the dictionary 116:

WK1 to WK6: work 1 to work 6

XXXV1, XXXV2: variable X1, variable X2

YYYV1 to YYYV3: variable Y1 to variable Y3

ZZZV1: variable Z1

Figure 10:
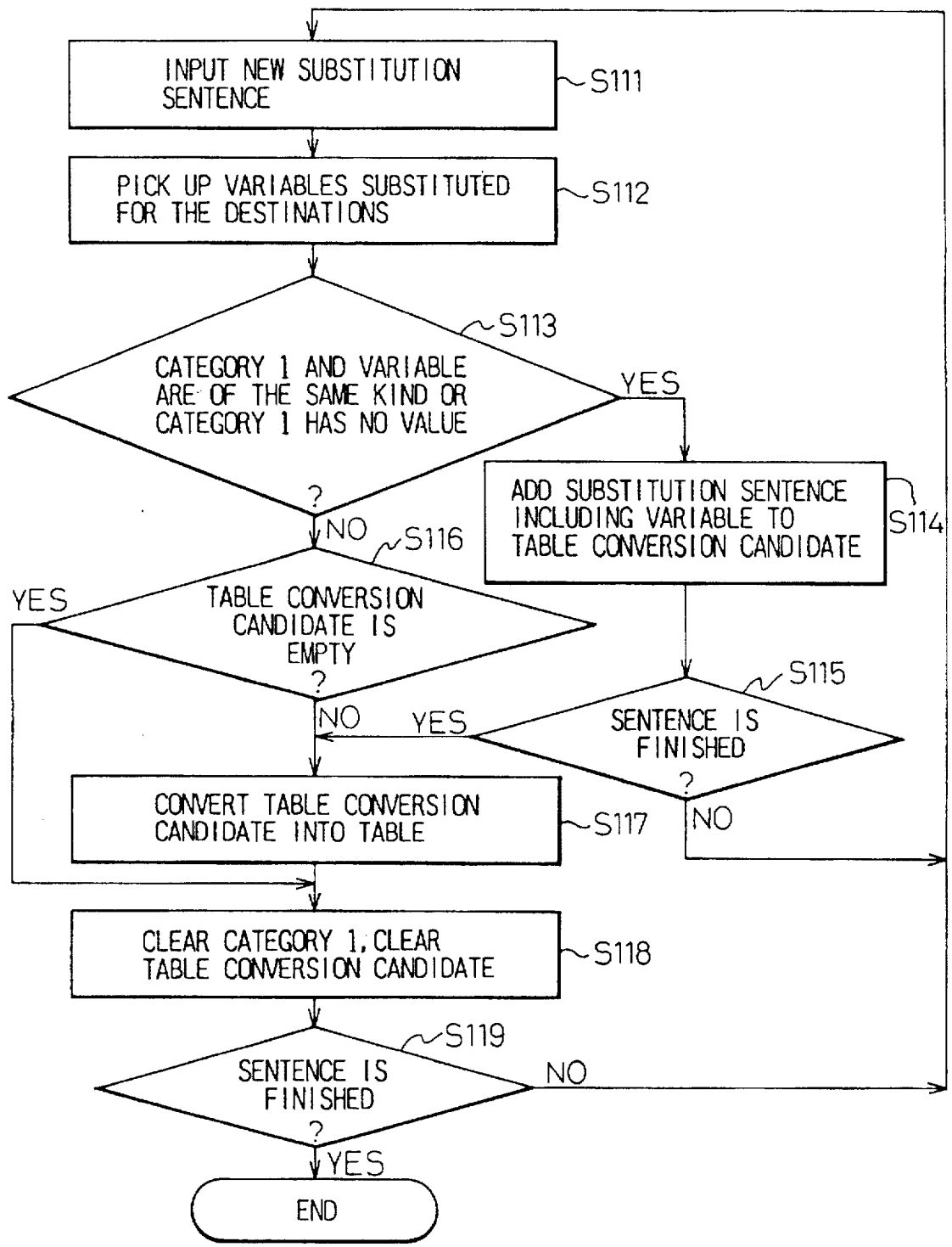
FIG. 10 is a diagram of a flowchart for converting the consecutive rows of substitution sentences into a table.

FIG. 10 is a flowchart for converting consecutive rows of substitution sentences into a table. The embodiment will now be described with reference to FIG. 10.

In FIG. 10, when a new substitution sentence is input at a step S111, a step S112 picks up variables which are substituted for the destinations.

A step S113 judges whether a category 1 of the variable previously substituted for the destination and the new variable substituted for the destination are of the same kind (in terms of naming rule, data structure, etc.) or not, or whether the category 1 has no value (initial substitution sentence) or not.

When the substitution sentence is first input, the category 1 does not have any value, whereby the program proceeds to a step S114 where the substitution sentence that includes a variable is added to a table conversion candidate, and a variable of the same kind as the variable substituted for the destination picked up therefrom is set as the category 1. Then, a step S115 judges whether the sentence is finished or not. When the sentence is not finished, the program returns to the step S111.

Referring, for instance, to FIGS. 9(a) to 9(c), when a variable "XXXV1" substituted for the destination is picked up first, a substitution sentence which includes the above variable is added as a table conversion candidate, and a variable substituted for the destination (or in this case, a variable substituted for the destination starting with three characters "XXX") which is of the same kind as the above variable substituted for the destination is set as a category 1. Then, a new substitution sentence is input at a step S111, and a variable substituted for the destination is picked up at a step S112. At a step S113, it is judged whether the above-mentioned category 1 is of the same kind as a new variable that is substituted for the destination, or whether the category 1 has no value.

Here, when the variable substituted for the destination that is picked up is "YYYV1", it is not of the same kind as the category 1, and the program proceeds to a step S116 where it is judged whether the table conversion candidate is empty or not. When the table conversion candidate is not empty (in this case, the variable "XXXV1" has been set as the category 1, and is not empty), the table converted by the present invention is terminated before the substitution sentence that is input. Therefore, the table conversion candidate is converted at a step S117.

When the variables substituted for the destinations of the same kind are not consecutively input, the substitution sentences are not converted into a table but are directly converted into a natural language. When, for instance, "YYYV1" which is a variable substituted for the destination of a different category is picked up after the variable "XXXV1" substituted for the destination is picked up as described above, it means that the variables substituted for the destinations starting with three characters "XXX" are not consecutively input and are not, hence, converted into a table, but the substitution sentence is directly converted into a natural language which reads "SET VARIABLE X1 TO WORK 1" as shown in FIG. 9(c).

Then, at a step S118, the category 1 and the table conversion candidate are cleared to be ready for the next table conversion, and it is judged at a step S119 whether the sentence is finished or not. When the sentence is not finished, the program returns back to the step S111 where the processing is carried out in the same manner as described above for the substitution sentence that includes a variable "YYYV1" substituted for the destination. As shown in FIG. 9(a), for instance, when the substitution sentences are consecutively input including variables substituted for the destinations starting with three characters "YYY" after the substitution sentence including the variable "XXXV1" has been input, the substitution sentences including these variables substituted for the destination are added as table conversion candidates and are converted into a table at the step 117.

As a result, variables "YYYV1", "YYYV2" and "YYYV3" substituted for the destinations are converted into "VARIABLE Y1", "VARIABLE Y2" and "VARIABLE Y3" which are natural language expressions corresponding thereto, and the substitution sentences are converted into a table as shown in FIG. 9(c). Before the table is attached a sentence reading SET VALUES TO THE FOLLOWING REGIONS".

Then, substitution sentences including variables "ZZZV1", "XXXV2" substituted for the destinations that are input are converted into "SET WORK 5 TO VARIABLE Z1" and "SET WORK 6 TO VARIABLE X2", respectively, as shown in FIG. 9(c) just like the case when the substitution sentence including the variable "XXXV1" substituted for the destination is input.

FIGS. 11(a) to 11(c) illustrate examples in which substitution sentences in the conditional branch sentences are converted into a table. FIG. 11(a) is a COBOL program that is to be converted, FIG. 11(b) shows an interim expression in the interim expression unit (1) formed by the syntax analyzing unit 112, and FIG. 11(c) shows the result when the substitution sentences in the conditional branch sentence including variables "YYYV1" to "YYYV3" are converted into a table.

Figure 12:
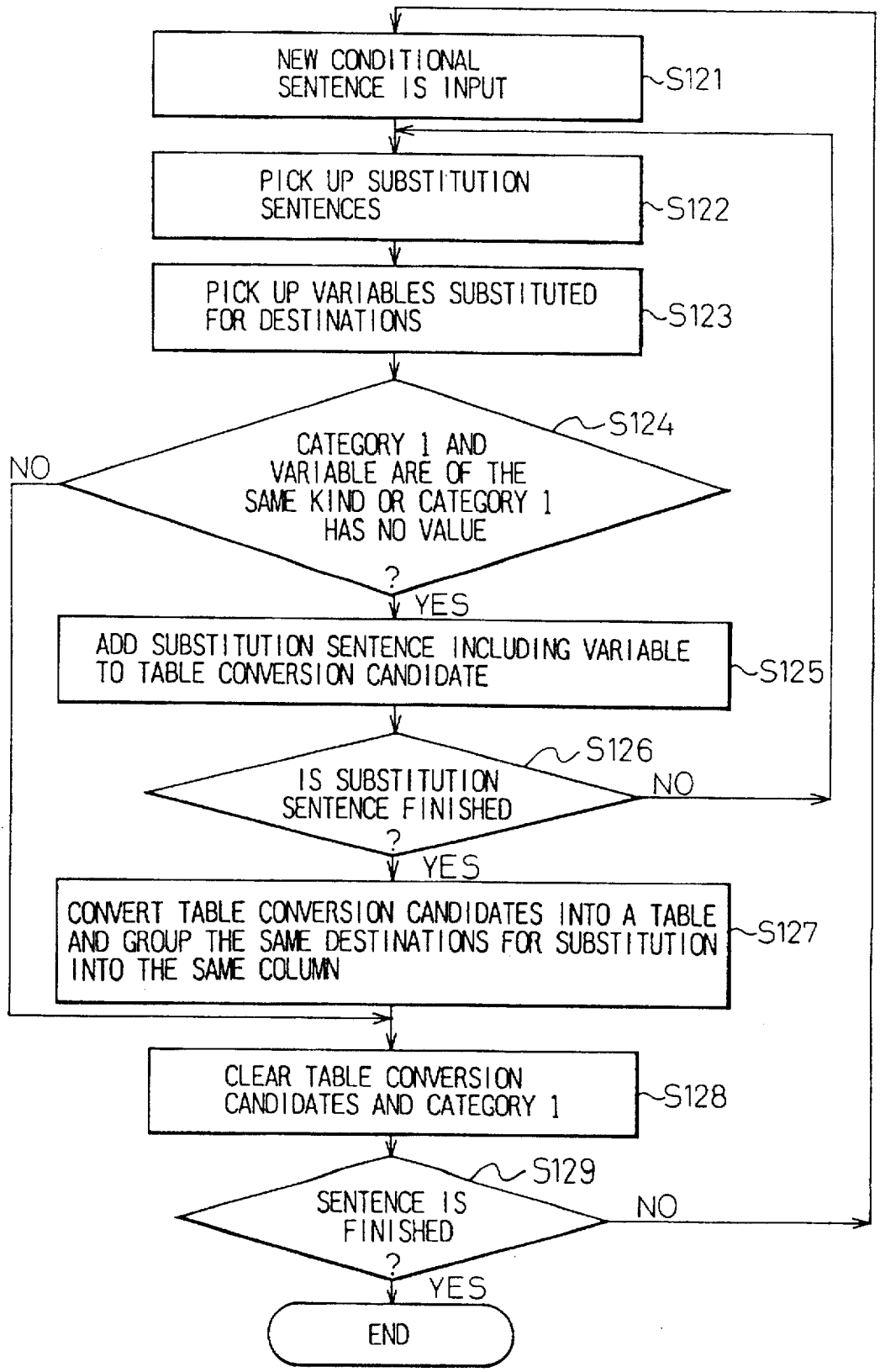
FIG. 12 is a diagram of a flowchart for converting the substitution sentence in the conditional branch sentence into a table.

FIG. 12 is a flowchart for converting substitution sentences in the conditional branch sentence into a table. The embodiment will now be described in compliance with the flowchart of FIG. 12.

A new conditional sentence is input at a step S121, and a substitution sentence thereof is picked up at a step S122. A step S123 picks up a variable substituted for the destination, and a step S124 judges whether the variable is of the same kind as the category 1 or whether the category 1 has no value. As in the case of the flowchart of FIG. 10, the category 1 has no value when the substitution sentence is first input, and the program proceeds to a step S125 where the substitution sentence including the variable is added to a table conversion candidate, a variable of the same kind as the picked-up variable that is substituted for the destination is set as the category 1, and a condition is added to the source of substitution.

Then, it is judged at a step S126 whether the substitution sentence is finished or not. When the substitution sentence is not finished, the program returns back to the step S122 where a next substitution sentence is picked up. Referring, for instance, to FIGS. 11(a) to 11(c), when the variable "YYYV1" substituted for the destination is picked up first, a substitution sentence that includes the above variable is added as a table conversion candidate, and a variable substituted for the destination which is of the same kind as the above variable substituted for the destination is set as the category 1. Then, to the source of substitution is added a condition "WHEN cond-A" that corresponds to "IF cond-A THEN". When the sentence is not finished, the program returns to the step S122 where the next substitution sentence is picked up.

Then, it is judged at a step S124 whether the variable substituted for the destination of the substitution sentence picked up at the step S123 is of the same kind as the category 1 or not. When the picked-up variable substituted for the destination is "YYYV2" as in, for example, the above-mentioned case, it is of the same kind as the category 1, and the program proceeds to a step S125 where a substitution sentence including the above variable is added as a table conversion candidate, and a condition "IF cond-A" which corresponds to "IF cond-A THEN" is added to the source of substitution.

Then, a substitution sentence is added as a table conversion candidate in the same manner, and as a substitution sentence which includes the variable "YYYV3" substituted for the destination of FIG. 11(a) is input and is added to the table conversion candidate, the substitution sentence is finished and the program proceeds to a step S127.

At a step S127, the table conversion candidates are converted into a table, and the same destinations for substitution are grouped into the same column. At a step S128, the table conversion candidates and the category 1 are cleared to be ready for the next table conversion, and a step S129 judges whether the sentence is finished or not. When the sentence is not finished, the program returns back to the step S121 to repeat the above-mentioned processing.

When it is judged at the step S124 that the picked-up variable that is substituted for the destination is not of the same kind as the category 1, the program proceeds to the step S128 where the table conversion candidates and the category 1 are cleared to be ready for the next table conversion in the same manner as described above. Then, a step S129 discriminates whether the sentence is finished or not. When the sentence is not finished, the program returns back to the step S121 to repeat the above-mentioned processing.

As a result of the above processing, variables "YYYV1", "YYYV2" and "YYYV3" substituted for the destinations are converted into "VARIABLE Y1", "VARIABLE Y2" and "VARIABLE Y3" which are the corresponding natural language expressions, and the conditions "IF cond-A", "IN OTHER CASES" and "IF NOT cond-A" are added to the sources of substitution as shown in FIG. 11(c), and the substitution sentence is converted into a table for every variable that is substituted for the destination. Before the table is attached a sentence reading "SET VALUES TO THE FOLLOWING REGIONS".

FIGS. 13 to 15 illustrate examples in which programs constituted by the above-mentioned rows of substitution sentences and rows of substitution sentences in the conditional branch sentence are converted into a table. FIG. 13 illustrates a COBOL program which is to be converted, FIG. 14 illustrates an interim expression in the interim expression unit (1) 113 formed by the sentence analyzing unit 112, and FIG. 15 illustrates the result of converting the interim expression into a table.

Figure 16:
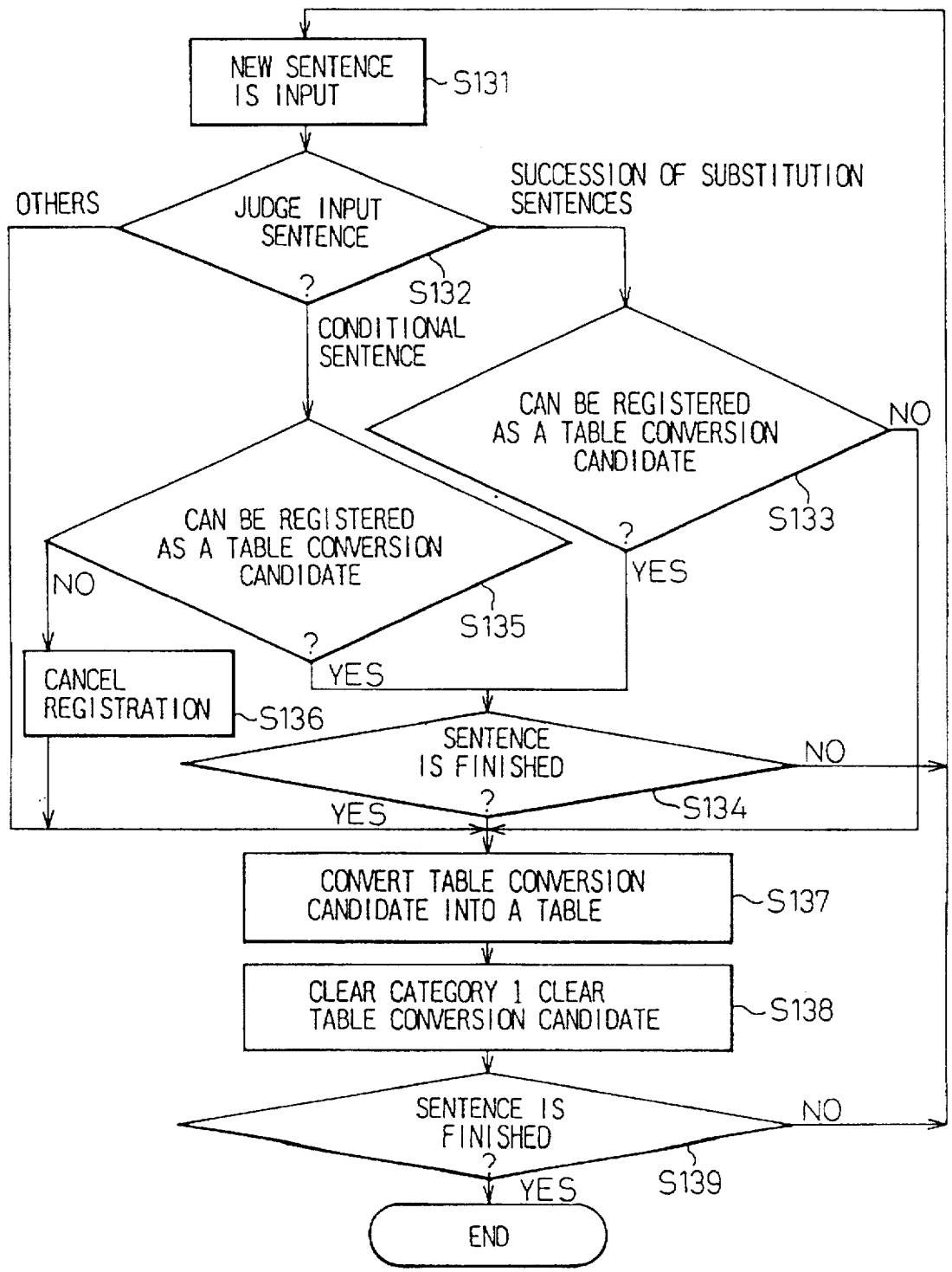
FIG. 16 is a diagram of a flowchart for converting consecutive tables into a table.

FIG. 16 is a diagram of a flowchart for converting the rows of substitution sentences and rows of substitution sentences in the conditional branch sentence into consecutive tables. This embodiment will now be described with reference to FIG. 16.

A new sentence is input at a step S131, and the input sentence is judged at a step S132. When the input sentence is a succession of substitution sentences, the processing explained with reference to the flowchart of FIG. 10 is executed at a step S133 to judge whether they can be registered as table conversion candidates.

When the sentence can be registered as a table conversion candidate, the program proceeds to a step S134 where it is judged whether the sentence is finished or not. When the sentence is not finished, the program returns back to the step S131 to repeat the above-mentioned processing. When a destination of substitution of a different kind appears during the processing at the step S133, the registration of the table conversion candidate is interrupted, and the program proceeds to a step S137 where the table conversion candidate is converted into a table. Then, a step S138 clears the table conversion candidate and the category 1 to be ready for the next table conversion, and a step S139 judges whether the sentence is finished or not. When the sentence is not finished, the program returns back to the step S131 to repeat the above-mentioned processing.

When it is judged at the step S132 that the input sentence is a conditional branch sentence, the program proceeds to a step S135 where the processing described with reference to the flowchart of FIG. 12 is carried out to judge whether the sentence can be registered as a table conversion candidate.

When the sentence can be registered as a table conversion candidate, the program proceeds to the step S134 where a process that is the same as the one described above is executed. When a destination of substitution of a different kind appears during the processing at the step S133, the conditional branch sentence cannot be converted into a table which is the same as the one existing already. Therefore, a step S136 cancels the past registration, and the same processing as the one mentioned above is executed at the step S137.

When it is judged at the step S132 that the input sentence is one that is not to be converted into a table, the program proceeds to the step S137 where the processing described above is executed.

As a result of the above processing, the program shown in FIG. 13 is converted into a table shown in FIG. 15. Owing to the coupling of tables, even a substitution sentence which by itself cannot be converted into a table can be grouped into one table as represented by a substitution for the variable Y9 at the last part of FIG. 15.

Figure 2:
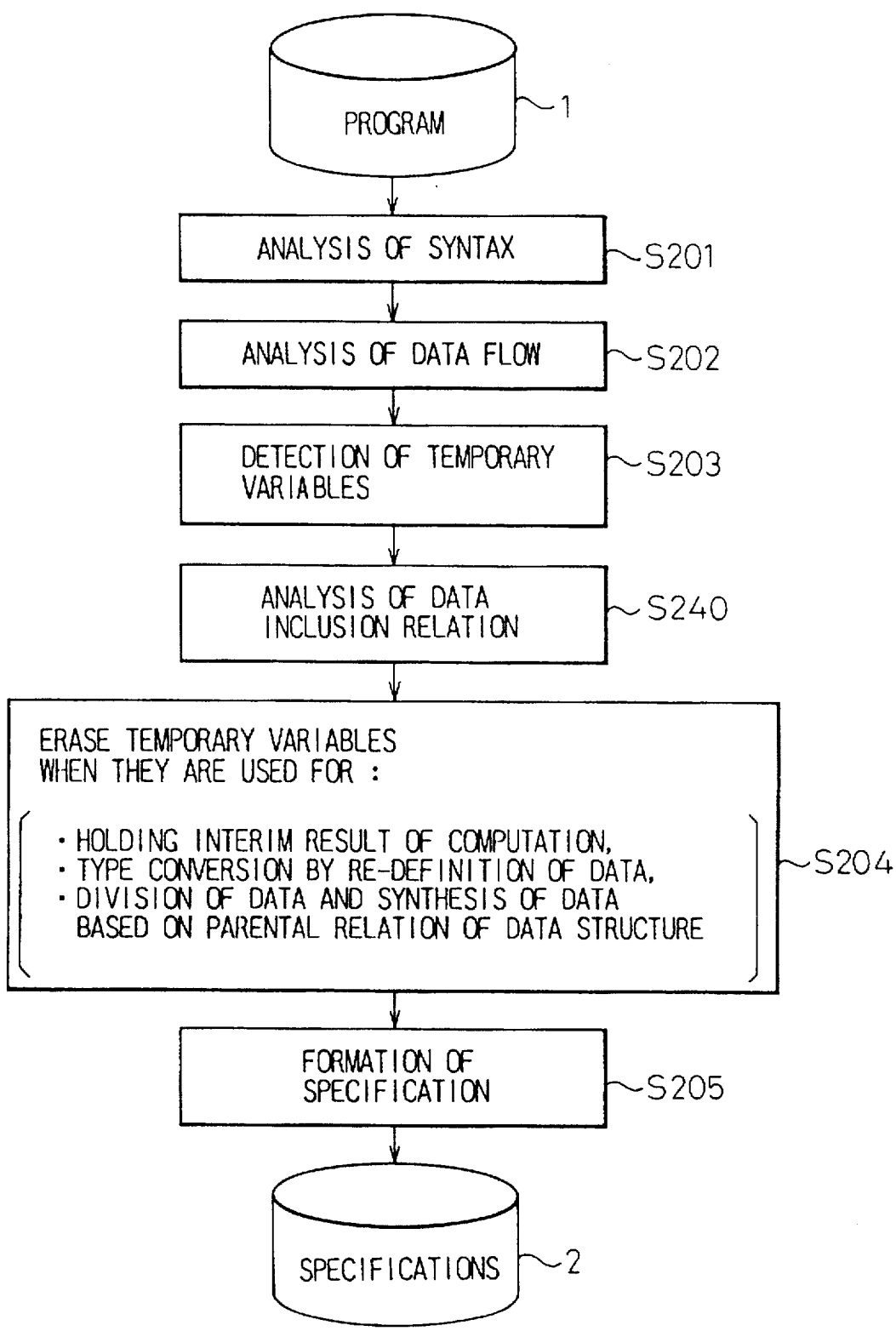
FIG. 2 is a diagram illustrating the principle of a second embodiment of the present invention.

FIG. 2 is a diagram illustrating the principle of the second embodiment of the present invention.

In FIG. 2, reference numeral 1 denotes a program from which the specifications are to be written as mentioned earlier with reference to FIG. 1, and reference numeral 2 denotes specifications. In the present invention as shown in FIG. 2, the program 1 is analyzed to form syntax structure information and data attribute information (S201), the data flow of program 1 is analyzed to form data flow information (S202), and specifications 2 are automatically formed from the given program based upon the syntax structure information, data attribute information and data flow information.

In this case, an inclusion relation of data is analyzed from the data attribute information thereby to form data inclusion relation information, and a temporary variable included in the program 1 is detected (S203, S204). Then, the role of the temporary variables is judged in the program 1 that is detected based upon the syntax structure information, data attribute information, data flow information, and data inclusion relation information. The specifications are formed while erasing the temporary variables when they are used only for improving the efficiency such as holding the interim result of computation, when they are used for the type conversion by the re-definition of data, when they are used for dividing the data based on a parental relation of the data structure, or when they are used for synthesizing the data based on the parental relation of the data structure (S205, S206).

That is, the structure of the input program 1 is analyzed to obtain syntax structure and data attributes, and the data flow is analyzed to obtain data flow information.

Further, the names of temporary variables are detected in the program 1, and the data are detected that have an inclusion relation for the temporary variables that are detected.

Then, the data flow is followed from a point of making reference to the temporary variables up to a point of setting variables that are related thereto relying upon the inclusion relation of data, and the use of the temporary variables (holding interim result of computation, type conversion, division, synthesis, etc.) is judged inclusive of information of data inclusion relation. The data flow information is analyzed to judge whether the temporary variables can be erased or not. The temporary variables that can be erased are then erased so that a description can be formed that agrees with the use. After the temporary variables are erased as described above, the specifications 2 are obtained by substituting a natural language description for the interim expression obtained through the above-mentioned processing by utilizing names of data and conversion rules into natural language.

According to the present invention, the temporary variables used in the program are erased as much as possible as described above making it possible to automatically form specifications maintaining quality higher than that of the conventional ones.

FIG. 17 is a diagram illustrating the fundamental constitution of an apparatus for automatically forming program specifications according to the second invention. In FIG. 17, an input program 211 is the one from which the specifications are to be written. A sentence analyzing unit 212 analyzes the input program 211 and forms an interim expression which expresses the sentence structure and the data attribute. The interim expression unit (1) 213 has a first interim expression formed by the sentence analyzing unit 212. A data flow analyzing unit 214 analyzes the first interim expression to pick up data flow information. An intermediate expression unit (2) 215 has a second interim expression that is obtained as a result of analysis by the data flow analyzing unit 214. A dictionary 216 holds the name that expresses a meaning which corresponds to an identifier in the program. A temporary variable detecting unit 217 detects temporary variables used in the program. A data inclusion relation analyzing unit 218 analyzes the inclusion relation of data in the variables. A temporary variable erasing unit 219 erases temporary variables as much as possible from the second interim expression based upon the second interim expression in the interim expression unit (2) 215 and the results of the temporary variable detecting unit 217 and of the data inclusion relation analyzing unit 218. A natural language conversion unit 220 substitutes a natural language for the interim expression erased by the temporary variable erasing unit 219 based on information of the dictionary 216, and forms specifications 221.

In FIG. 17, the input program 211 is analyzed by the sentence analyzing unit 212 to form the first interim expression which expresses the sentence structure and the data attribute which are fed to the interim expression unit (1) 213. The data flow analyzing unit 214 analyzes the first interim expression that is formed, adds data flow information thereto to form the second interim expression which is then fed to the interim expression unit (2) 215.

The temporary variable detecting unit 217 specifies names of variables which are temporary variables in the second interim expression. The data inclusion relation analyzing unit 218 detects data that have an inclusion relation relative to the temporary variables detected by the temporary variable detecting unit 217.

The temporary variable erasing unit 219 traces the data flow on the second interim expression from a point where reference is made to the temporary variables to a point where the related variables are set based on the inclusion relation of data, and judges the use of the temporary variables (holding the interim result of computation, type conversion, division, synthesis, etc.) inclusive of data inclusion relation information. The data flow information is analyzed to judge whether the temporary variables can be erased. When they can be erased, the interim expression is rewritten so as to form the description that agrees with the use.

The natural language conversion unit 220 substitutes natural language description for the second interim expression by utilizing names of data registered in the dictionary 216 and the rules for converting an interim expression into natural language of the natural language conversion unit 220.

Described below in detail are functional operations of each of the portions shown in FIG. 17.

(1) Syntax analyzing unit

The syntax analyzing unit 212 of FIG. 17 is a means which analyzes the input program 211 using a known algorithm that is used in a compiler and the like, and forms the first interim expression that expresses the syntax structure and the data attribute. The first interim expression formed by the syntax analyzing unit 212 is constituted by a symbol table (data attribute information) and a syntax tree (syntax structure information).

Figures 18A, 18B:
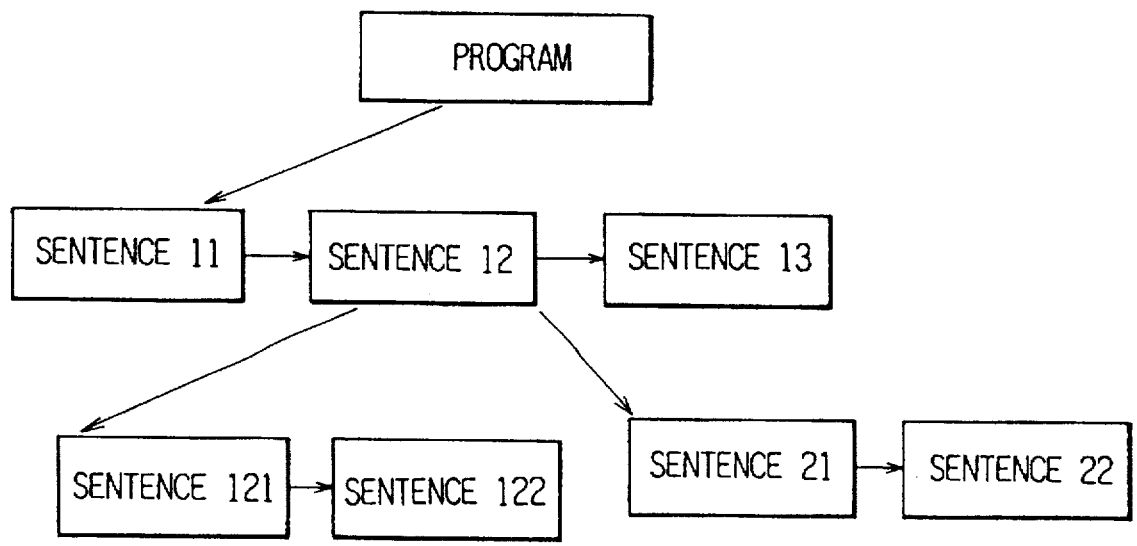
FIG. 18(a) is a diagram of a symbol table formed by the syntax analyzing unit.
FIG. 18(b) is a diagram of a syntax tree formed by the syntax analyzing unit.

FIGS. 18(a) and 18(b) are diagrams illustrating the symbol table and the syntax tree formed by the syntax analyzing portion 212, wherein FIG. 18(a) illustrates the symbol table and FIG. 18(b) illustrates the syntax tree.

As shown in FIG. 18(a), the following information is registered to the symbol table.

(a) Names of variables.

(b) Types of variables.

(c) Initial values of variables.

(d) Pointer to information of the most significant (parent) variable.

(e) Pointer to information of the least significant head (eldest son) variable.

(f) Pointer to a variable (younger brother) which has the same parent and is defined next.

(g) Pointer to information of a variable which is re-defined.

(h) Pointer to a place where a variable is set on the syntax tree.

(i) Pointer to a place where reference is made to a variable on the syntax tree.

(j) Information of a variable having an inclusion relation to the variable.

Here, as will be described later, the above (h) and (i) are set through the processing by the next data flow analyzing unit 214. Information (j) is set by the data inclusion relation analyzing unit 218 but is not set in the step of syntax processing.

FIG. 18(b) illustrates the syntax tree which represents the syntax structure of the program.

The individual nodes of the syntax tree correspond to instruction sentences of the program and have the following information which as a whole constitutes the program.

[In the case of a substitution sentence]

Information of kind of sentence (which becomes "=substitution" in the case of a substitution sentence.

Pointer to a basic block.

Pointer to formula at the source of substitution.

Pointer to a column of a name table corresponding to a variable substituted for the destination.

Pointer to a next sentence.

[In the case of a conditional branch sentence]

Information of kind of sentence (which becomes "=conditional branch" in the case of a conditional branch sentence).

Pointer to a basic block.

Pointer to a conditional formula.

Pointer to the head of a sentence of the THEN portion.

Pointer to the head of a sentence of an ELSE portion.

Pointer to a next sentence.

[Information of a conditional formula]

Kind of operator.

Pointer to information of the formula of the right side.

Pointer to information of the formula of the left side.

Here, the pointer to the basic block is information that is set by the next data flow analyzing unit 214, but that is not set by the processing of the syntax analyzing unit 212.

(2) Data flow analyzing unit

Figure 20:
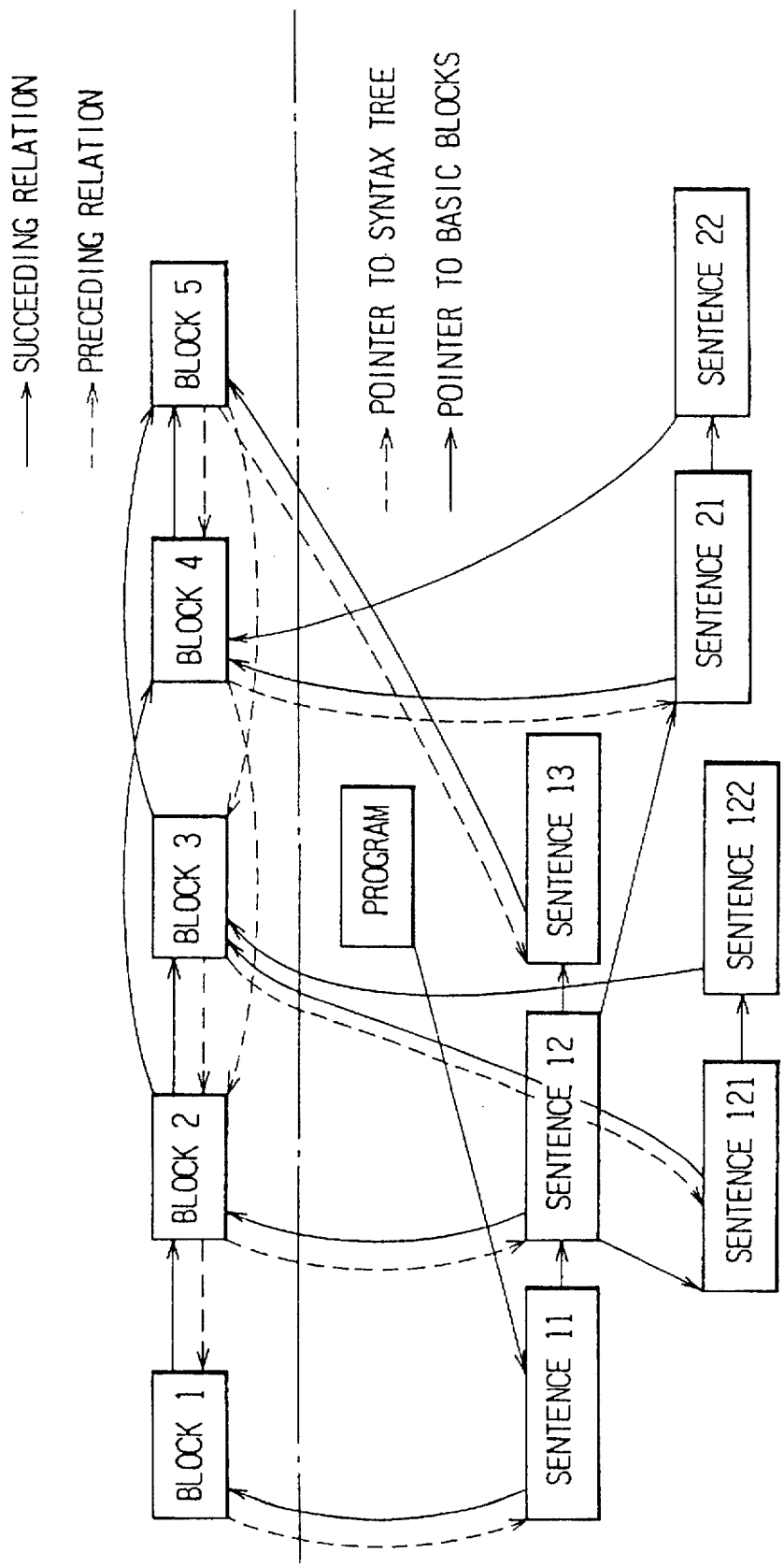
FIG. 20 is a diagram (2) showing a relationship between the basic block and the syntax tree.

The data flow analyzing unit 214 is a means which analyzes the first interim expression to pick up data flow information. FIGS. 19 and 20 illustrate, respectively, basic block information formed by the processing of the data flow analyzing unit 214 and a relationship between the basic blocks and the syntax tree.

The data flow analyzing unit 214 divides the program into blocks (which are referred to as basic blocks) which are not branched into control flows, and registers variable/reference information for each of the blocks. The data flow analyzing unit 214 further registers "(h) information of setting place" and "(i) information of reference place" to the symbol table of variables shown in FIG. 18(a).

As shown in FIG. 19, the following information are registered to the individual basic blocks.

(a) Block number.

(b) Pointer to a start position of basic blocks on the syntax tree.

(c) List of numbers of succeeding blocks.

(d) List of numbers of preceding blocks.

(e) List of sets of variables set in the block and pointers to the positions of variables.

(f) List of sets of variables referred to in the block and pointers to the positions of variables.

The data flow analyzing unit 214 buries pointers to the basic blocks pertaining thereto even for the nodes (sentences) of the syntax tree. As described above, in information of the basic blocks are registered pointers of head positions of the basic blocks on the syntax tree. Therefore, the syntax tree and the basic blocks can be referred to by each other. That is, as shown in FIG. 20, for instance, a block 1 and a sentence 11, a block 2 and a sentence 12, etc., can be referred to by each other as indicated by dotted lines and solid lines. Furthermore, a relation between the preceding blocks and the succeeding blocks is recorded in the basic block information shown in FIG. 19.

FIG. 21 is a diagram of a program which concretely explains the embodiment. This program converts numerals of five digits to a zip code.

In the program of FIG. 21, when such numerals as "100" or "10090" are input to ZPCDIN of the first line, an output "100" or "100–90" is produced from ZPCDOUT of the second line. In this program, a variable to which is attached "TMP—" such as "TMP-ZOCD1", etc., is a temporary variable, and "PICTURE X ( )" represents a type of the variable.

In this program, furthermore, temporary variables "TMP-ZPCD11" and "TMP-ZPCD12" are included in a temporary variable "TMP-ZPCD1", and "TMP-ZPCD11" corresponds to the first three digits of "TMP-ZPCD1" and "TMP-ZPCD12" corresponds to the last two digits of "TMP-ZPCD1". Similarly, the above-mentioned relation holds true for "TMP-ZPCD2", "TMP-ZPCD3" and for the succeeding variables.

Figure 22:
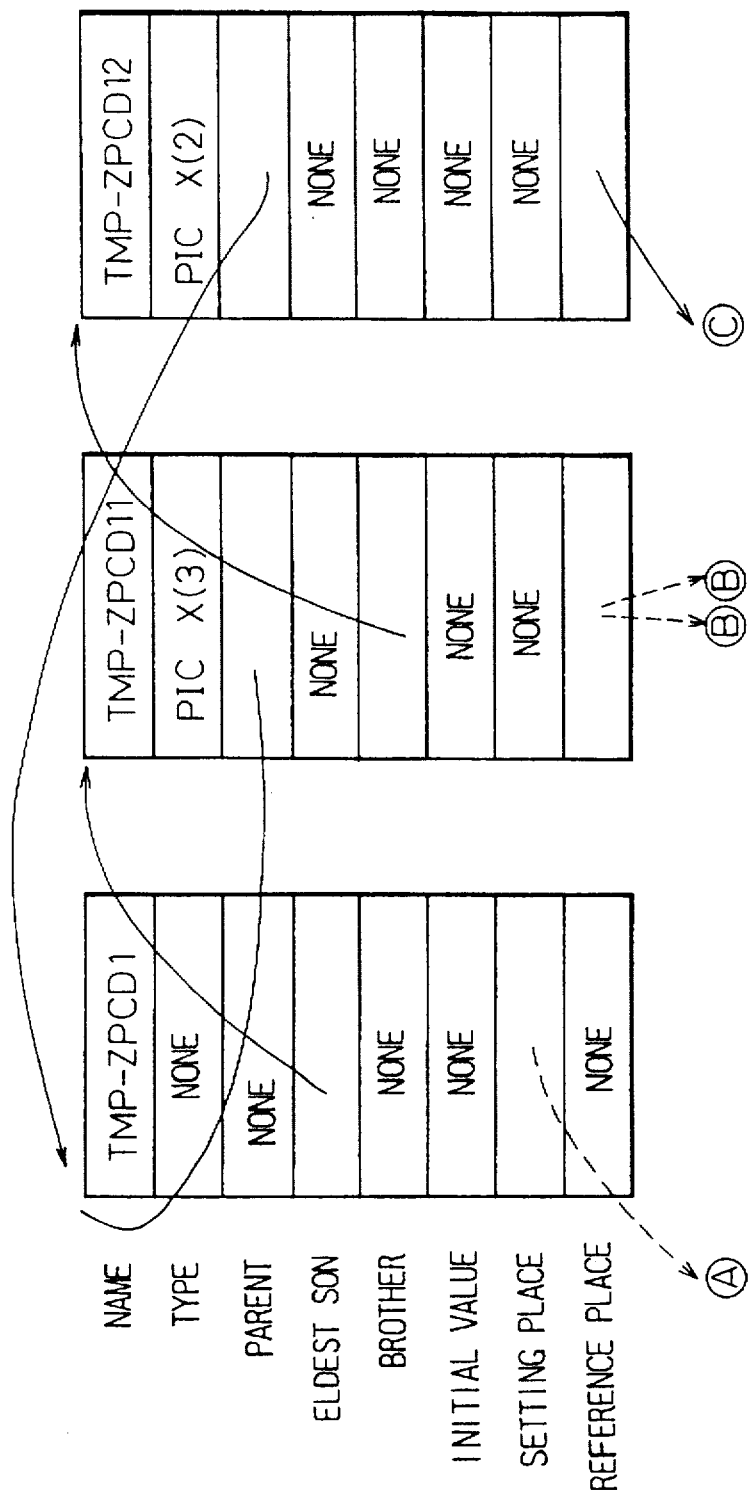
FIG. 22 is a diagram (1) illustrating an interim expression of a program.
Figure 23:
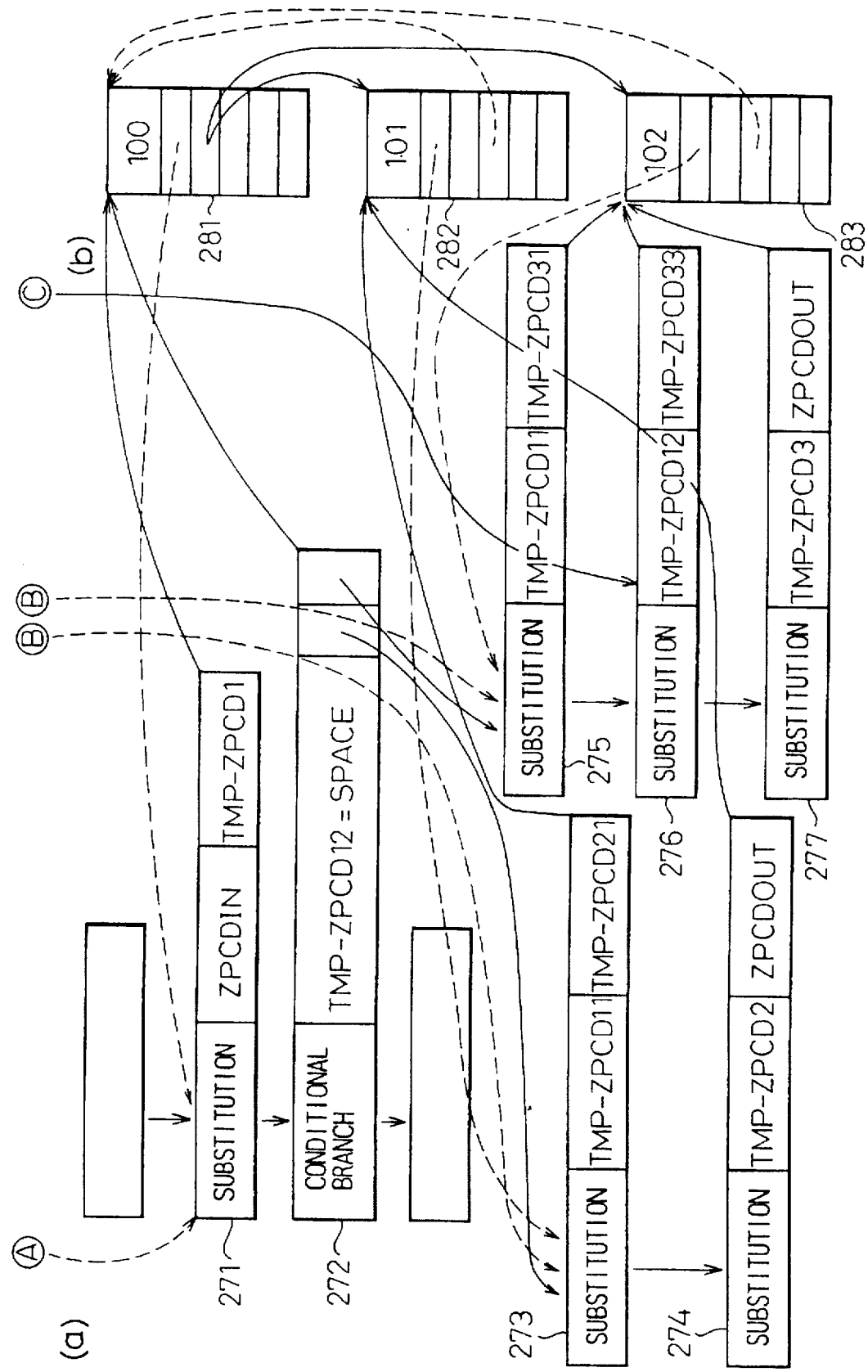
FIG. 23 is a diagram (2) illustrating an interim expression of the program.

FIGS. 22 and 23 are diagrams explaining an interim expression of the program.

FIG. 22 illustrates a symbol table formed by the syntax analyzing unit 212, and FIG. 23 illustrates a relation between the syntax tree and the basic blocks. Symbols A, B and C attached to tops of dotted arrows and solid arrows of FIG. 22 are linked to symbols A, B and C attached to solid lines and dotted lines in FIG. 23.

In the symbol table of FIG. 22 are registered "name, "type", "parental, brotherhood relations" and the like. As described above, furthermore, temporary variables "TMP-ZPCD11" and "TMP-ZPCD12" are included in the temporary variable "TMP-ZPCD1". Therefore, a pointer to the temporary variable "TMP-ZPCD11" is registered in the column of "eldest son" of the temporary variable "TMP-ZPCD1", and a pointer to the temporary variable "TMP-ZPCD1" of the parent is registered in the column of "parent" of the temporary variable "TMP-ZPCD11".

Furthermore, since the temporary variables "TMP-ZPCD11" and "TMP-ZPCD12" have a brotherhood relation, a pointer to "TMP-ZPCD12" is registered in the column of "brother" of the temporary variable "TMP-ZPCD11". Moreover, in the setting place and reference place of the symbol table are registered pointers to the syntax tree of FIG. 23 as denoted by A, B and C in FIG. 22. In FIG. 23, the diagram (a) illustrates a syntax tree and the diagram (b) illustrates basic blocks.

In the diagram (a), the nodes 271 to 277 of the syntax tree correspond to instructions of the program shown in FIG. 21. For instance, the node 271 corresponds to "MOVE—" of the program of FIG. 6 and the node 272 corresponds to "IF TMP—" of the program of FIG. 6.

In the case of a substitution sentence as described above, the node of the syntax tree has information of the kind of sentence (=substitution), pointer to a basic block, pointer to the formula at the source of substitution, pointer to the column of a name table corresponding to a variable substituted for the destination, and a pointer to a next sentence. In the case of a conditional branch sentence, the node of the syntax tree has information of the kind of sentence (=condition), pointer to a basic block, pointer to the conditional formula, pointer to the head of a sentence of the THEN portion, pointer to the head of a sentence of the ELSE portion, and a pointer to a next sentence.

In the diagram (b) of FIG. 23, reference numerals 281 to 283 denote basic blocks which have basic block information (see FIG. 19) described above.

The data flow analyzing unit 214 examines the kinds of sentences of the syntax tree in the interim expression shown in the diagram (a), executes the processing mentioned below to form a second interim expression consisting of basic blocks 281 to 283, and gives it to the interim expression unit (2) 215.

(i) In the case of a substitution sentence.

When there is no branching/joining in the preceding sentence, the same block is used as the preceding sentence.

When the preceding sentence has a branch such as a conditional branch sentence, a block is newly formed, and both of the final blocks of "THEN portion" and "ELSE portion" are registered as blocks that precede the succeeding blocks.

A variable appearing at the destination for substitution of the substitution sentence is registered in the list of set variables of basic blocks together with a pointer to the position of the variable. At the same time, a pointer to the position on the syntax tree is added to the item of the place for setting the variable in the symbol table (see FIG. 18(a)).

(ii) In the case of a conditional branch sentence.

A new block is used for the conditional portion irrespective of the preceding sentence. For the "THEN portion" and the "ELSE portion", new blocks are assigned for the head sentences; i.e., the head sentences are divided into blocks.

The block of the conditional portion is preceded by the block of the preceding sentence, and the final block of the blocks of the conditional portion serves as a head block for the "THEN portion" and the "ELSE portion".

Moreover, a variable appearing in the conditional formula of the conditional portion is registered in the list of reference variables of basic blocks of the conditional portion together with a pointer to the position of the variable. At the same time, a pointer to the position on the syntax tree is added to the item of a place for making reference to the variable in the symbol table.

(iii) In the case of a "goto" sentence.

A new block is used and is permitted to jump to a succeeding block.

(3) Temporary variable detecting unit

The temporary variable detecting unit 217 detects a temporary variable from the symbol table (see FIG. 18(a)) by utilizing the rules of naming variables described below, and registers it in a table together with a place where reference is made thereto.

[Rules of naming]

First four characters "TMP—" temporary variable "FLG—" flag

In the case of a COBOL program, the data item (variable) defined in the WORKING-STORAGE SECTION is regarded to be a temporary variable.

(4) Data inclusion relation analyzing unit

The data inclusion relation analyzing unit 218 finds all variables that structurally include the temporary variables, i.e., finds (1) variables (ancestor and re-defined variables) that include temporary variables, (2) variables (descendent variables) included in the above variables, and (3) variables re-defining (differently naming) the above variables and ancestors thereof.

The data lengths are calculated from the data types for each of the temporary variables, and the inclusion relation is classified into four, i.e., ancestors, descendants, the same region, and those having portions in common. From these information and related positions of the ancestors, information related to how many bytes the starting positions of the descendants are deviated are registered as a set to the symbol table.

Described below is a notation of data structure by COBOL.

EXAMPLE 1

01 TMP

02 TMP1 PICTURE X(3)

02 TMP2 PICTURE X(3)

In this example, TMP1 and TMP2 are judged to be descendants of TMP by tracing the list of parent and brothers in the symbol table. By analyzing this and the type of data specified by a phrase PICTURE, deviations in the starting positions of ancestors are found to obtain the following information of inclusion relation.

TMP ((TMP1, descendant, 0), (TMP 2, descendant, 3))

TMP1 ((TMP, ancestor, 0))

TMP2 ((TMP, ancestor, 3))

In the above description, the final numerals "0" and "3" in parentheses represent deviations in the starting positions of the ancestor and descendant. For instance, TMP1 and TMP represent no deviation in the digits, and TMP2 and TMP represent deviation of three digits.

EXAMPLE 2

01 TMP PICTURE X(6)

01 TMP-R REDEFINES TMP

02 TMP-R1 PICTURE X(3)

02 TMP-R2 PICTURE X(3)

In this example, the variable TMP-R re-defines the variable TMP, and it is judged that they specify the same region. From the parental link, furthermore, it is considered that TMP-R1 and TMP-R2 are descendants of both TMP and TMP-R. In this case, the information of inclusion relation of symbol table becomes, for example, as follows:

TMP ((TMP-R, same.), (TMP-R1, descendant, 0), (TMP-R2, descendant, 3))

TMP-R1 ((TMP, ancestor, 0), (TMP-R, ancestor, 0))

EXAMPLE 3

01 TMP PICTURE X(6)

02 TMP1 PICTURE X(2)

02 TMP2 PICTURE X(4)

01 TMP-R REDEFINES TMP

02 TMP-R1 PICTURE X(3)

02 TMP-R2 PICTURE X(3)

In this example, the relation between TMP1, TMP2 and TMP-R1, TMP-R2 is found for its length by using type information (registered to symbol table by the syntax analysis) specified by PICTURE and onwards. In this example, TMP1 and TMP2 are two bytes and four bytes, respectively, and TMP-R1 and TMP-R2 are three bytes, respectively, from this it is understood that TMP-R1 is an "ancestor" which includes TMP1, and it is judged that TMP-R2 and TMP1 have regions which are partly in common. The inclusion relation information of the symbol table in this case becomes, for example, as follows:

TMP ((TMP1, descendant, 0), (TMP2, descendant, 2), (TMP-R, same), (TMP-R1, descendant, 0), (TMP-R2, descendant, 3))

TMP-R1 ((TMP, ancestor, 0), (TMP-R, ancestor, 0), (TMP1, descendant, 0), (TMP2, partly in common))

(5) Temporary variable erasing unit

The temporary variable erasing unit 219 is a means which erases as much as possible the temporary variables from the second interim expression of the interim expression unit (2) 215 based on the second interim expression and the results of the temporary variable detecting unit 217 and of the data inclusion relation analyzing unit 218. The temporary variable erasing unit 219 erases the temporary variables by repeating the processes of (i) to (iii) that will be described later until temporary variables that can be substituted/ deleted are all eliminated.

Figure 24:
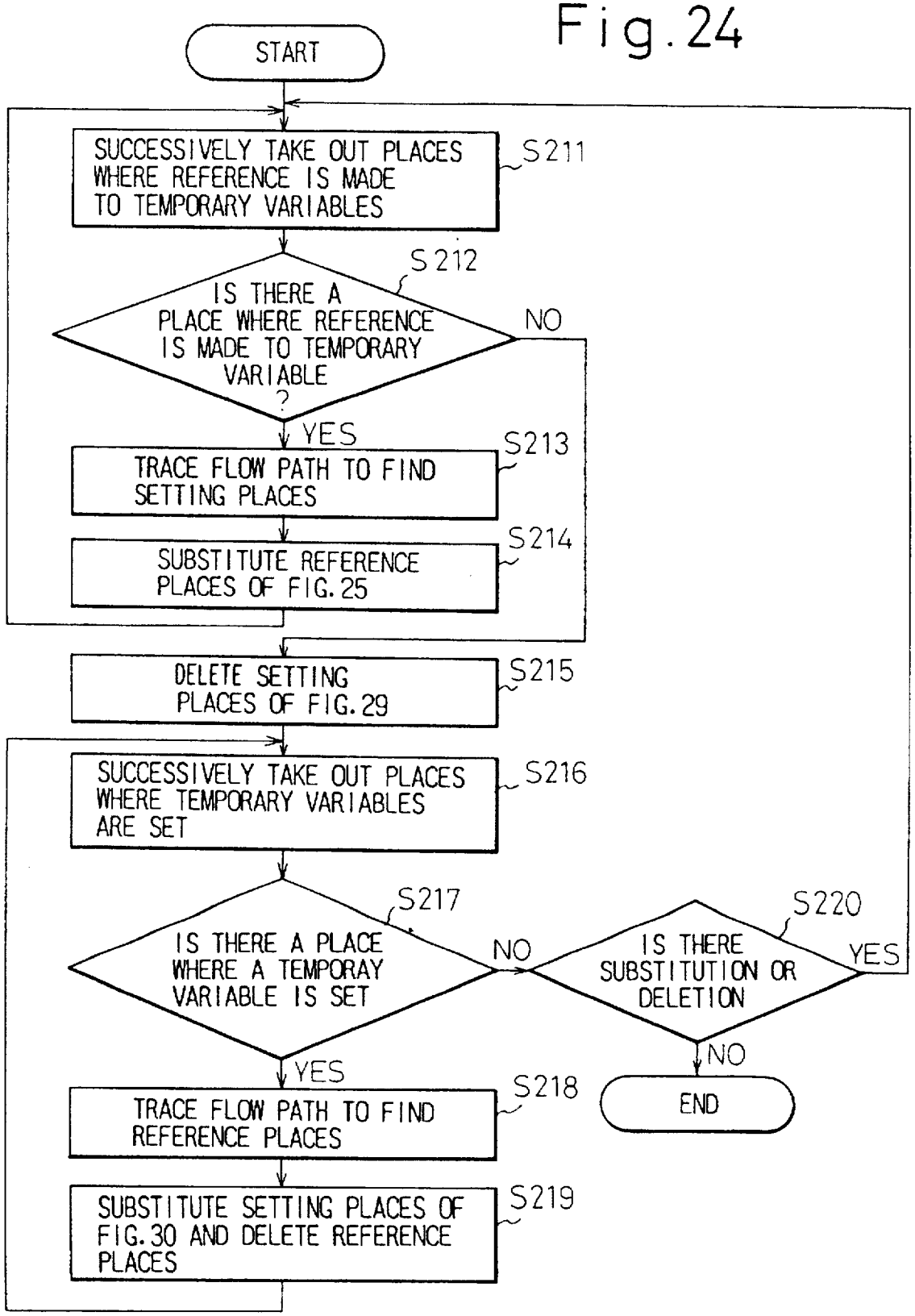
FIG. 24 is a flowchart which schematically illustrates the processing in a unit for erasing temporary variables.

FIG. 24 is a flowchart which schematically illustrates the processing in the temporary variable erasing unit 219.

In FIG. 24, a step S211 successively takes out the places where reference is made to the temporary variables detected by the temporary variable detecting unit 217 by making reference to a symbol table, and a step S212 judges whether there is a place where reference is made to a temporary variable.

When there is a place where reference is made to the temporary variable, the program proceeds to a step S213 to find a setting place by tracing the flow path. Then, a step S214 effects the processings that will be described later relying upon a relation between a variable at the setting place and a temporary variable, and the program returns back to the step S211 to repeat the above-mentioned processing.

When there is no place where reference is made to the temporary variable at the step S212, the program proceeds to a step S215 where unnecessary setting places are deleted, and a step S216 successively takes out the places where the temporary variables are set. Then, a step S217 judges whether there is a place for setting a temporary variable. When there is a place where a temporary variable is set, the program proceeds to a step S218 where the flow path is traced to find a place where reference is made. A step S219 effects the processings that will be described later based on a relation between a variable at a place where reference is made thereto and a temporary variable, and the program returns back to the step S216 to repeat the above-mentioned processing. When it is judged at the step S217 that there is no place where the temporary variable is set, the program proceeds to a step S220 which judges whether the substitution or the deletion has taken place. When no substitution or deletion has taken place, the program is finished. When a substitution or deletion has taken place, the program returns back to the step S211 to repeat the above-mentioned processing.

A practical processing of the temporary variable erasing unit 219 will now be described with reference to the process flows of FIGS. 25 to 33 for a variety of cases.

Figure 25:
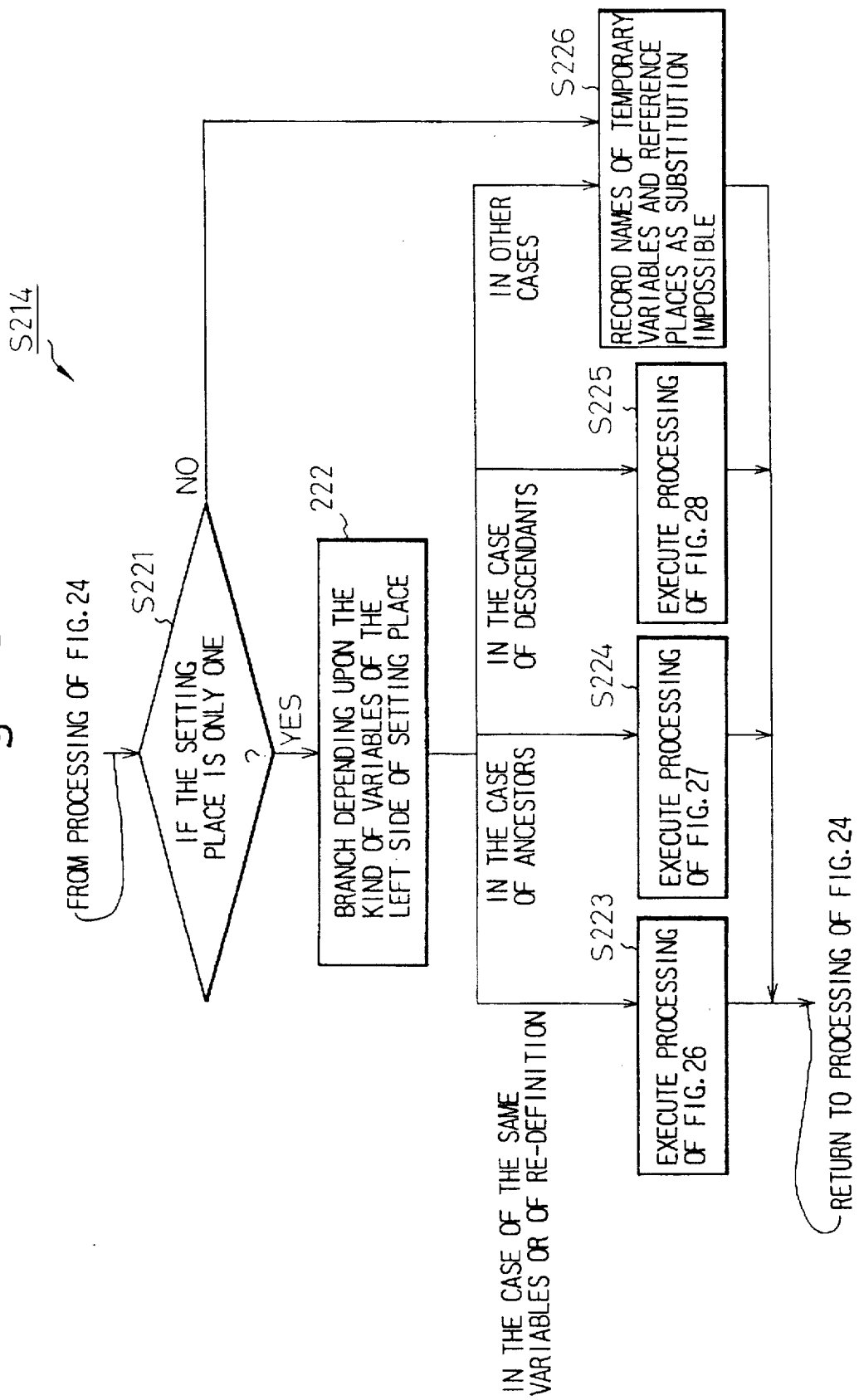
FIG. 25 is a flowchart illustrating the processing of reference portions.

(i) Substitution of place where reference is made to a temporary variable (see S214 of FIG. 24; FIG. 25).

First, the setting sources are detected for the individual reference places (S213 of FIG. 24). The temporary variable detecting unit 17 finds a substitution sentence (setting source) that appears first in the flow path in relation to itself and in relation to the previously found variables that have a data structure inclusion relation for each of the temporary variables that are detected by utilizing the preceding relation of basic blocks from the individual reference places and the structure of the syntax tree while tracing the control flow. Branches that exist are found for each of the paths.

In the following cases, the division processing is carried out depending upon how the setting source was detected.

(a) When all paths arrive at one setting source (yes of S221).

In this case, the temporary variables can be deleted by using the right side of the substitution sentence. In the following case, therefore, the division processing is carried out based on a relation between a variable substituted for the destination and a temporary variable that is referred to (S222).

Figure 26:
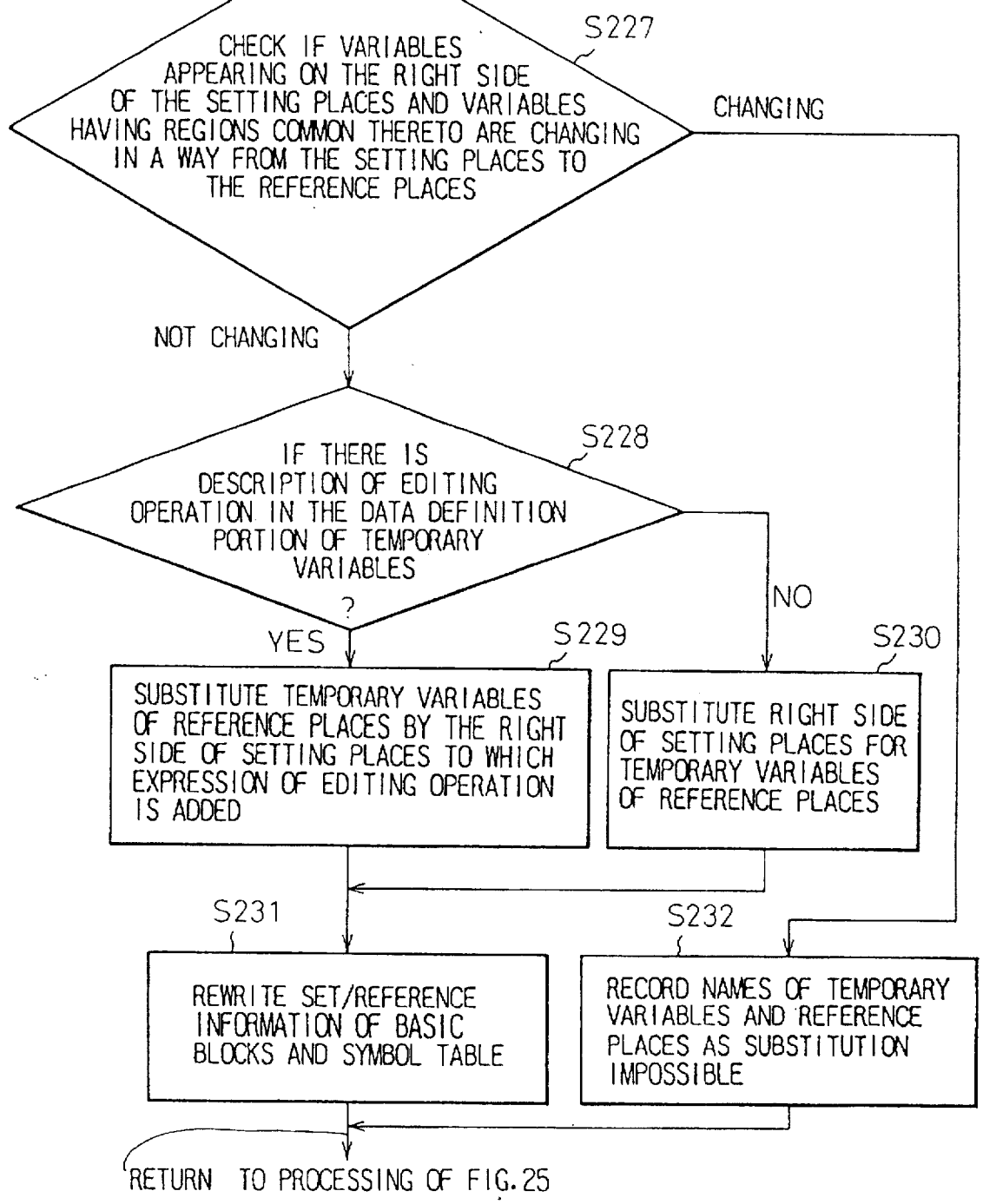
FIG. 26 is a flowchart illustrating the processing of the case of the same variables or of the re-definition (of the case of interim result or type conversion)

(A) In the case of a setting to a temporary variable itself that is being referred to (see S223 of FIG. 25; FIG. 26).

That is, in the following case, $TMP \leftarrow A + B$ sentence 1

...

$X \leftarrow TMP$ sentence 2

In this case, when A or B is not changing in a way from sentence 1 to sentence 2, then the temporary variable is quite useless or is introduced for preserving the interim result for increasing the efficiency of calculation, and can hence be substituted.

Therefore, the formula of the right side of the sentence 1 is taken out to examine whether the variables appearing in the formula are all changing in a path from the sentence 1 to the sentence 2. In the above example, A, B and variables having a data structure inclusion relation thereto are picked up to examine whether they are changing (S227).

When they are not changing, a place where reference is made to a temporary variable is substituted in the formula of the right side of sentence 1. In the above example, the sentence 2 is substituted as follows (S230).

$X \rightarrow A+B$ sentence 2'

In the sentence 2', therefore, variables A, B are referred to and variable TMP is not referred to. Therefore, the basic block and reference information of symbol table are updated (S231).

When A or B is changing in a way from sentence 1 to sentence 2; the substitution cannot be effected. Therefore, the temporary variable and the reference place (sentence 2) are registered as a set in the list of reference places where substitution is impossible (S232). In the case of COBOL, the data definition of the temporary variable TMP may be the description of an editing operation as follows (yes of S228):

01 TMP PICTURE 999.999

In this case, when the substitution can be effected while satisfying the above conditions, the meaning is represented by the following expression (S229).

Edit $X \rightarrow (A+B)$ into the form of 999.999 sentence 2"

(B) In the case of a setting of a referred temporary variable to a re-defined variable (see S223 of FIG. 25; FIG. 26).

This will be, for instance, the following case.

01 *TMP* PICTURE $X(10)$

01 *TMP-R* REDEFINES *TMP* PICTURE

9(10)

...

$TMP-R \leftarrow A + B$ sentence 1

...

$X \leftarrow TMPS$ sentence 2

This is the case where the temporary variables are used for the conversion of type and should not appear on the specifications. In this case, therefore, the substitution is effected in the same manner as in (i) described above, and reference information of variables is also updated in the same manner (S228 to S231).

Figure 28A:
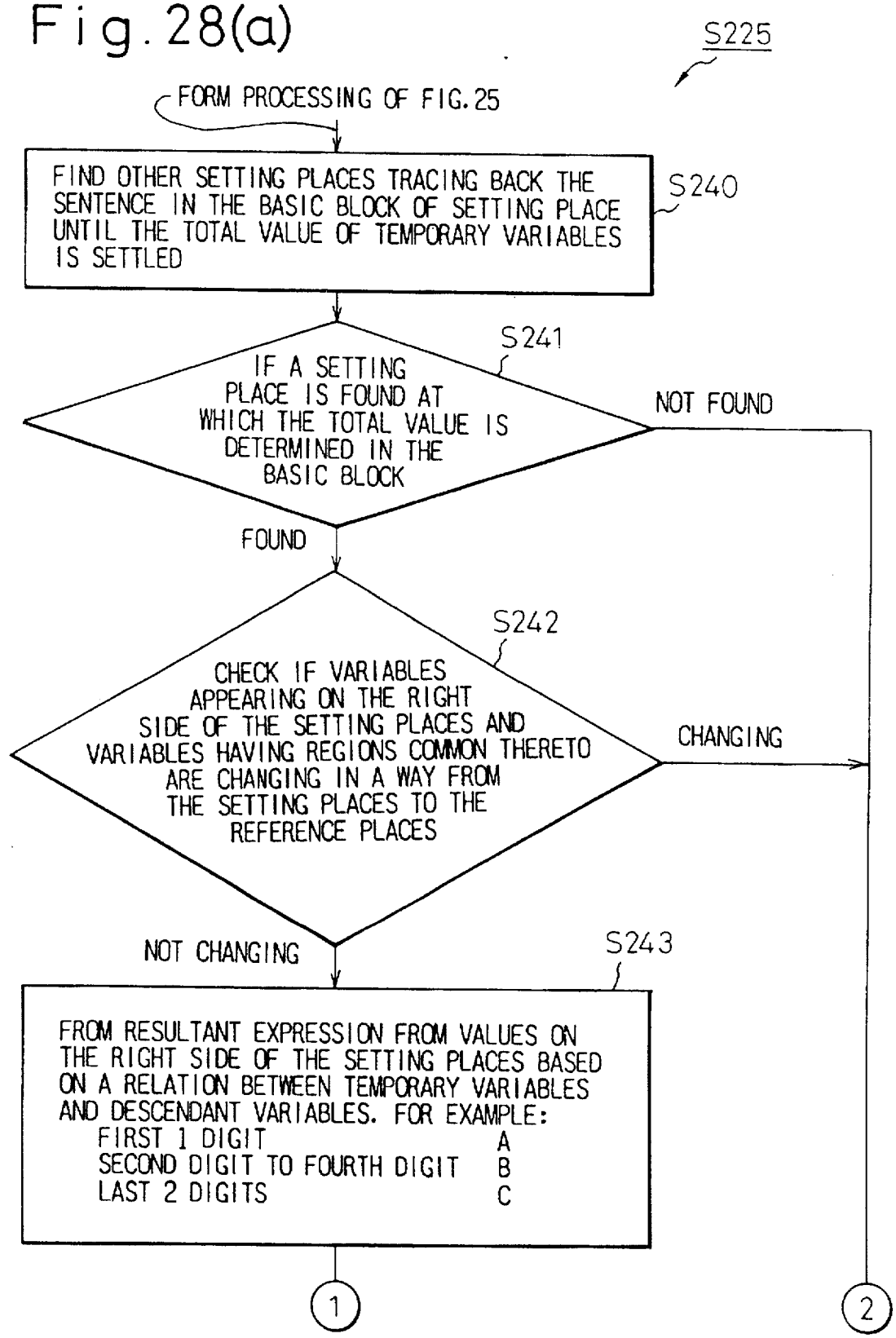
FIG. 28(a) is a flowchart (1) illustrating the processing of the case of descendants (or the case of synthesizing rows of characters)
Figure 28B:
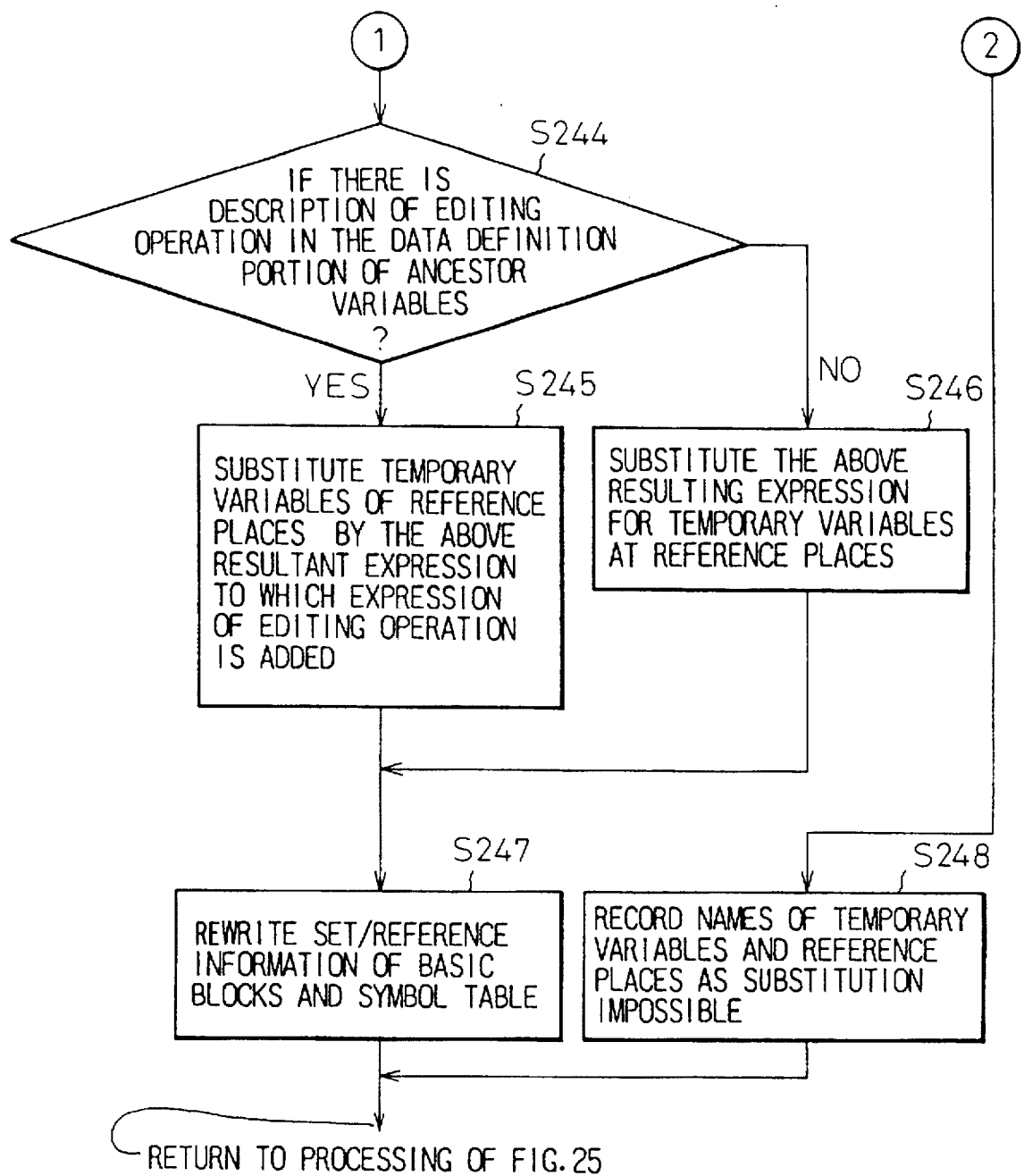
FIG. 28(b) is a flowchart (2) illustrating the processing of the case of descendants (or the case of synthesizing rows of characters)

(C) In the case of a setting to a variable of "descendant" included in a temporary variable (see S225 of FIG. 25; FIGS. 28(a) and 28(b)).

This will be, for instance, the following case.

01 *TMP1* PICTURE $X(3)$

02 *TMP2* PICTURE $X(3)$

...

$TMP1 \leftarrow A$ sentence 1

...

$X \leftarrow TMP$ sentence 2

This is the case where the temporary variables are used for the synthesis of data. In this case, the control flow is traced, and the substitution sentences are found for the descendant variables until values of the portions of the temporary variables are all determined (S240, S241).

Accordingly, sentences can be substituted for the thus found descendant variables when there is no branch path in the ways thereto and when the first place where reference is made to the temporary variable is a substitution sentence. For instance, TMP2 ← B sentence 0

...

TMP1 ← A sentence 1

...

X ← TMP sentence 2

Here, as in the case (A), the sentence can be substituted using data structure information when the values of variables (A, B) included in the formulas of the right sides of the substitution sentences (sentence 0, sentence 1) are not changing in the path to the sentence 2. That is, the sentence 2 is substituted by the substitution sentences (S242 to S246).

Upper three digits of X→A sentence 2'-1

Lower three digits of X→B sentence 2'-2

Therefore, variables A, B are referred to in the sentence 2'-1 and in the sentence 2'-2, and X is set. No reference is made to the variable TMP. In response thereto, set/reference information is updated in the basic blocks and in the symbol table (S247).

When the sentence cannot be substituted, the temporary variable and the reference place (sentence) are registered as a set in the list of reference places where substitution is impossible as described earlier (S248).

When the definition portions of data are as described below, and the temporary variables to be substituted partially have initial values, even the initial value portions are described as substitution sentences.

01 TMP

02 TMP1 PICTURE X(3)

02 TMP2 PICTURE X(3

02 FILLER PICTURE X(2) VALUE "**"

In this case, the sentence 2 is substituted as follows:

Upper three digits of X→A sentence 2"-1

Fourth digit to sixth digit of X→B sentence 2"-2

Lower two digits of X→"**" sentence 2"-3

(D) In the case of a substitution for the "ancestor" variables that include temporary variables (see S224 of FIG. 25; FIG. 27).

This will be, for instance, the following case:

01 TMP-PARENT

02 TMP1 PICTURE X(5)

02 TMP2 PICTURE X(3)

02 TMP3 PICTURE X(4)

...

TMP-PARENT ← A sentence 1

...

X ← TMP2 sentence 2

This is the case where temporary variables are used for dividing the data and in which a place (sentence 2) where reference is made to the temporary variable is substituted as follows only when the variables included in the right side of the setting (sentence 1) of the ancestor variable of the temporary variable is not changing in the path to the place (sentence 2) where reference is made to the temporary variable (S233 to S237).

X→sixth digit to eighth digit of A sentence 2'

In the reference 2', therefore, reference is made to the variable A but no reference is made to the variable TMP2, whereby reference information is updated in the basic blocks and in the symbol Table (S238).

In other cases, substitution is impossible, and the temporary variable and the reference place (sentence 2) thereto are registered as a set in the list of reference places where substitution is impossible (S239).

(b) In the case when the setting place differs for every path of control flow (no of S221 of FIG. 25).

This will be the following case.

TABLE 1

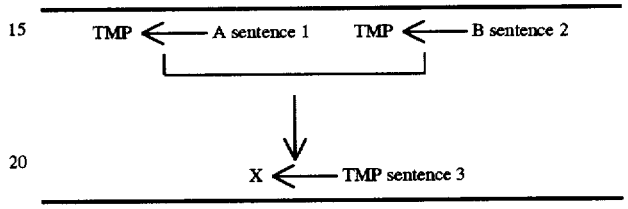

In this case, the reference place is not substituted, but the temporary variable and the reference place (sentence 3) are registered in the list of reference places where substitution is impossible (S226).

Figure 29:
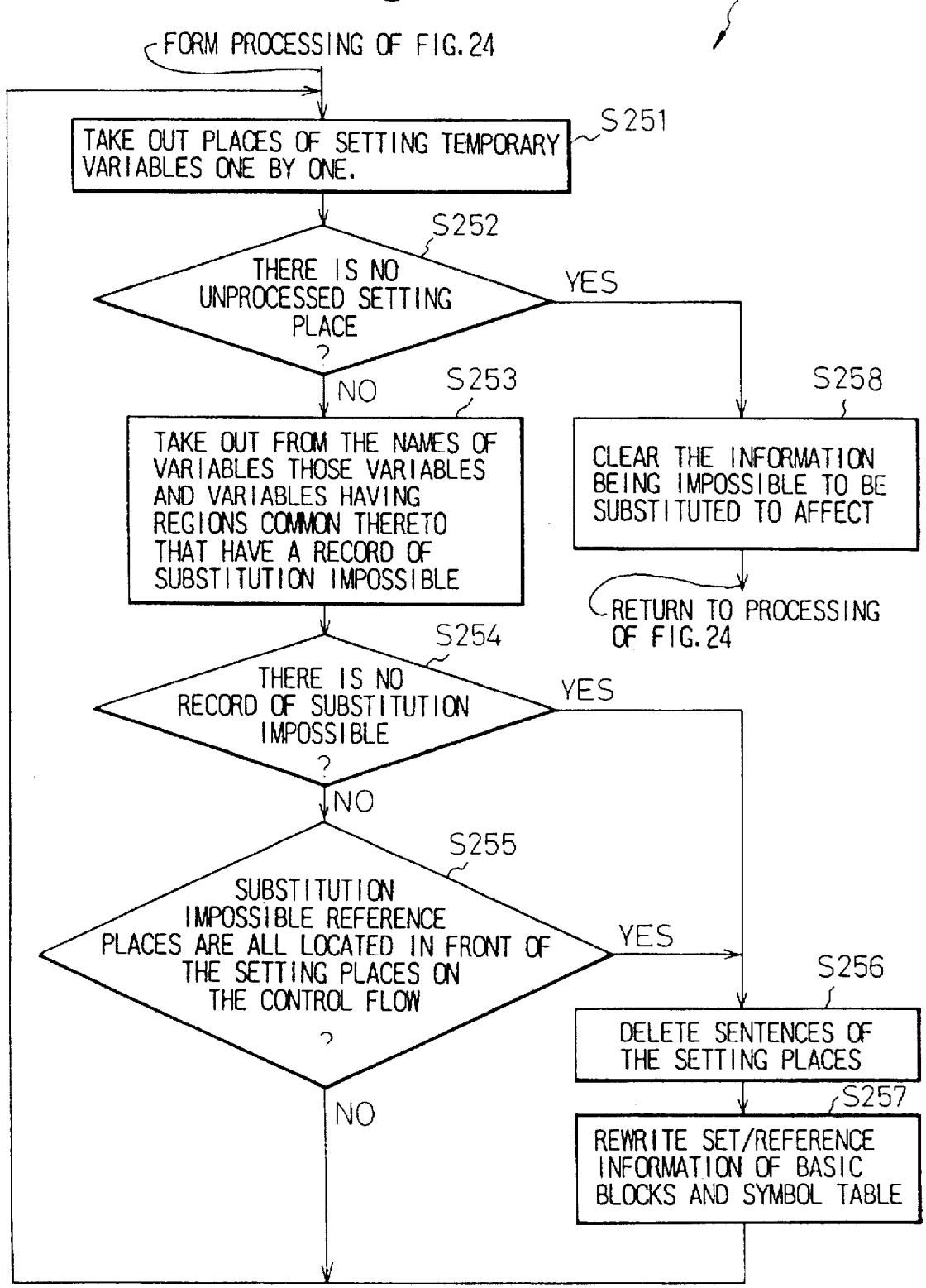
FIG. 29 is a flowchart illustrating the processing for deleting preset portions where there exist no reference portions.

(ii) Deletion of unnecessary places where temporary variables are set (see S215 of FIG. 24; FIG. 29).

In the operation for substituting the place for making reference to the temporary variable in (i) above, the substitution sentences at the setting places are deleted for the temporary variables that have no record of substitution being impossible in relation to themselves and the related variables (S251 to S256).

For instance, when the substitution is effected in (A) of (a) of (i) described above, TMP ← A + B sentence 1

...

X ← A + B sentence 2 and, hence, the sentence 1 is deleted when no reference is made to the TMP or to a variable that structurally includes TMP at any other place after the sentence 1 on the flow path.

Moreover, since the sentence 1 no longer has a reference/setting, the reference/set information is updated in the basic blocks and in the symbol table (S257).

After the above operation is effected for all temporary variables, the information of substitution being impossible is cleared (S258).

Figure 30:
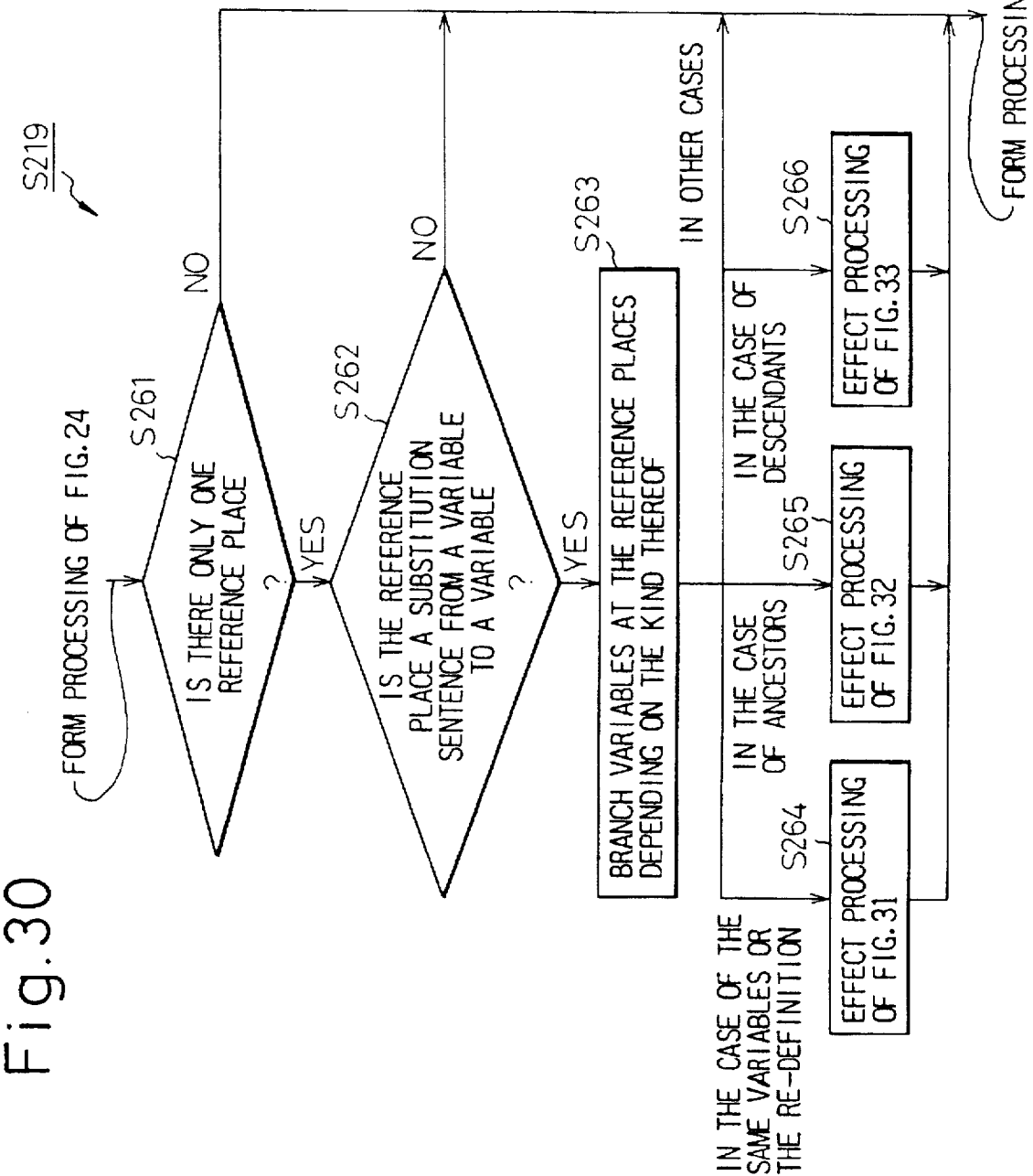
FIG. 30 is a flowchart illustrating the processing for substituting preset portions and for deleting reference portions.

(iii) The setting place is substituted by using a destination set at a reference place (see S219 of FIG. 24; FIG. 30).

Next, when the reference place is not substituted, it is attempted to substitute the setting place by using a destination that is set at the reference place. In this case, the reference place is found by backwardly tracing the flow path from the individual setting places.

(a) When there are a plurality of setting places or when reference is made within a formula.

When there are a plurality of setting places or when the reference is made within a formula as described below, the substitution is impossible and a next reference place is processed (S261 and no of S262)

X→TMP+1

(b) When there is one reference place which is a substitution sentence (the right side is not a formula) of from a variable into a variable (S261 and yes of S262).

When there is only one reference place, the processing is divided as follows depending on a relation between a setting place and data structure of a variable appearing at the reference place.

Figure 31:
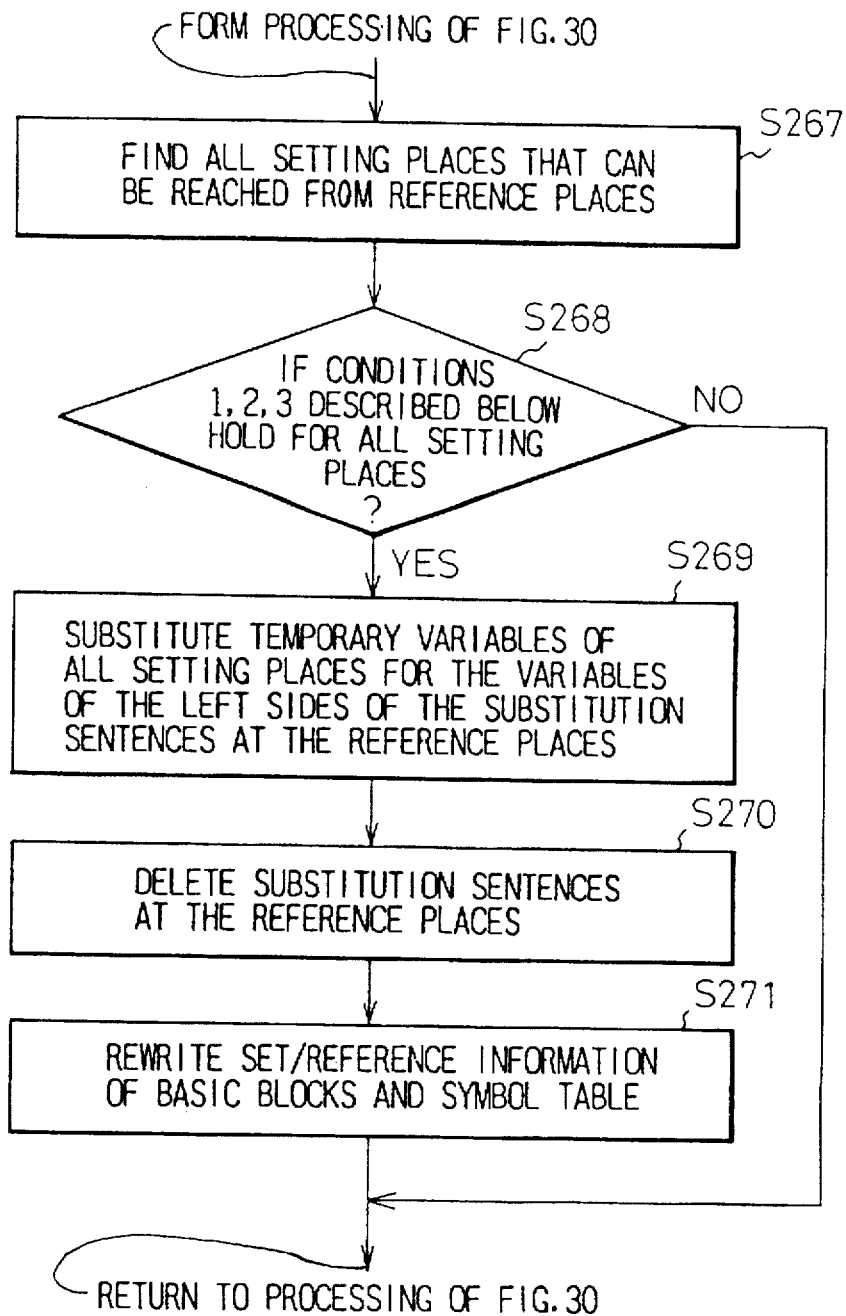
FIG. 31 is a flowchart illustrating the processing of the case of the same variables or of re-definition (of the case of interim result or type conversion)

(A) In the case of making a reference to the temporary variable itself that is being set (see S264 of FIG. 30; FIG. 31).

This will be the following case:

$TMP \leftarrow A$ sentence 1

... (A is changing in the way)

$X \leftarrow TMP$ sentence 2

In this case, effective setting places on a path are found that are different from the sentence 1 by reversely tracing the flow path from the reference place (sentence 2). A check is made to determine if the following three conditions all hold for all those setting places (S267, S268);

(1) There is no reference place other than the sentence 2 for the setting places.

(2) There is no reference to/setting of the variables on the left side of the substitution sentence (sentence 2) at the reference place and the variables which structurally include the data thereof on a path from the setting place to the reference place (sentence 2).

(3) It is certain to arrive at the reference place (sentence 2) from the setting place.

Substitute the left side of the substitution sentence at the reference place for the place of setting a temporary variable (S269), and record the sentence of the reference place in the list of reference places that are to be deleted (S270).

That is, in the above example, the sentence 1 is substituted by, $X \rightarrow A$ sentence 1'

The same holds even for other setting places. The reference place (sentence 2) is deleted.

Then, reference/set information of the basic blocks and symbol table is updated (S271) to reflect reference/set the relation of variables that are changed.

The substitution or the deletion is not effected when the above-mentioned conditions of substitution are not satisfied.

(B) In the case of making reference to a variable which is re-defined from the temporary variable that has been set (see S264 of FIG. 30; FIG. 31).

Effect the processing in the same manner as in (A).

Figure 32:
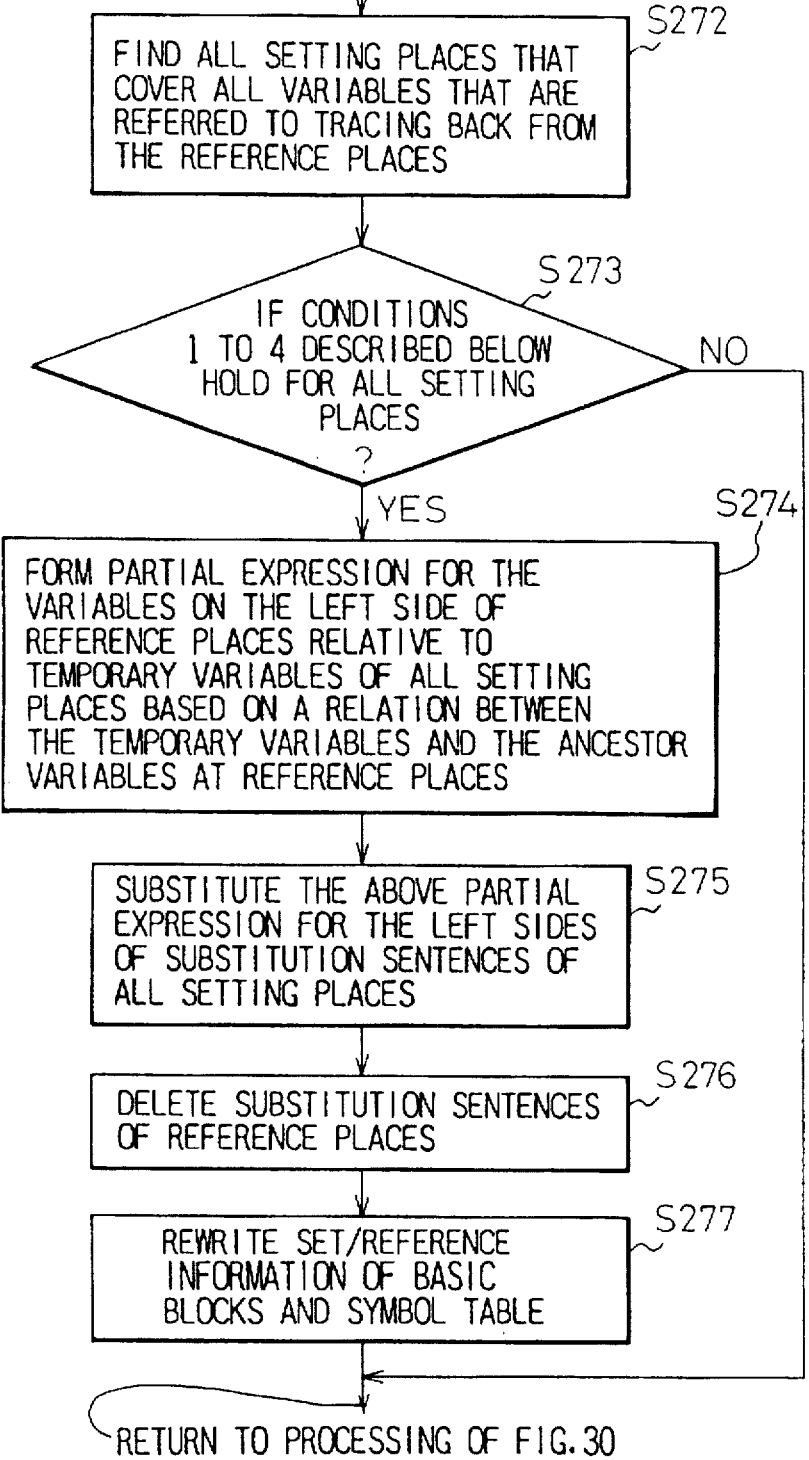
FIG. 32 is a flowchart illustrating the processing of the case of ancestors (or the case of synthesizing rows of characters)

(C) In the case of making reference to an "ancestor" variable which includes the temporary variable that has been set (see S265 of FIG. 30; FIG. 32).

This will be the following case;

01 $TMP$

02 $TMP1$ PICTURE $X(3)$

02 $TMP2$ PICTURE $X(3)$ $TMP1 \leftarrow A$ sentence 1

...

$X \leftarrow TMP$ sentence 2

In this case, the descendant setting places are all found tracing back the sentence 2 until the portions of the variables TMP are all set (S272). When the variables are set in addition to the path that includes the sentence 1, the places are found for each of the paths. This will be the following case for the path that includes the sentence 1.

$TMP2 \leftarrow B$ sentence 0

...

$TMP1 \leftarrow A$ sentence 1

...

$X \leftarrow TMP$ sentence 2

If there is no conditional branch among the partial settings (between sentence 0 and sentence 1 in the above example) for the setting places of the paths, and if the conditions (1) to (3) of (A) all hold for each of them, then the operation can be carried out to substitute the setting places (S273 to S275).

That is, in the above example,

Lower 3 digits of $A \leftarrow B$ sentence 0'

...

Upper 3 digits of $X \leftarrow A$ sentence 1'

This is effected even for other setting places. The reference place (sentence 2) is deleted (S276).

Furthermore, reference/set information of the basic blocks and symbol table is updated (S277) to reflect a reference/set relation of variables that are changed.

The substitution and deletion are not effected when the above-mentioned conditions of substitution are not satisfied.

Figure 33:
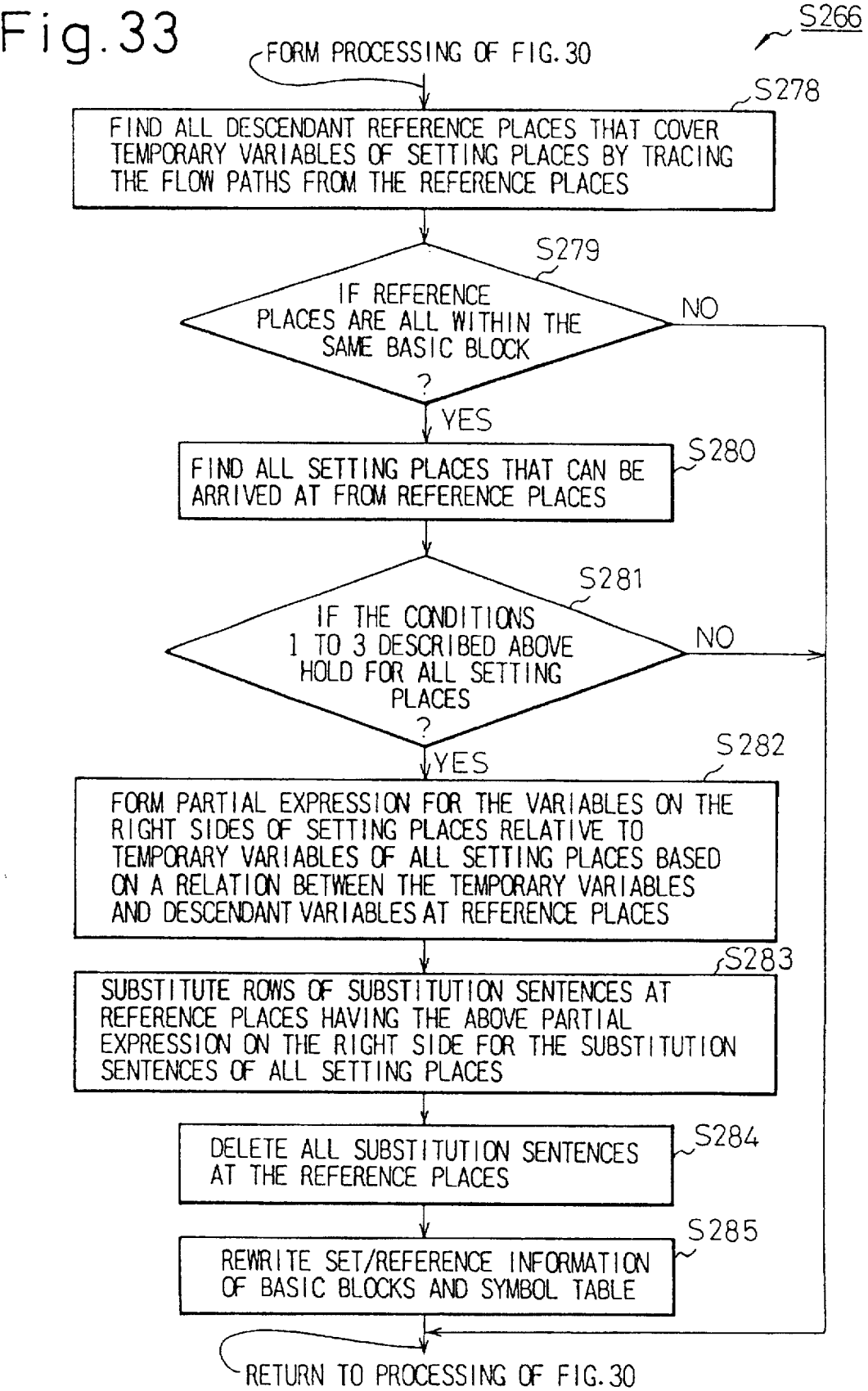
FIG. 33 is a flowchart illustrating the processing of the case of ancestors (or of the case of dividing rows of characters)

(D) When the reference place is for the variable that is included in the temporary variable (see S266 of FIG. 30; FIG. 33)

This will be the following case:

01 $TMP$-PARENT

02 $TMP1$ PICTURE $X(5)$

02 $TMP2$ PICTURE $X(3)$ $TMP$-PARENT $\leftarrow A$ sentence 1

...

$X \leftarrow TMP1$ sentence 2

In this case, "brother" variables and a reference place thereof are found by tracing the flow path from the sentence 1 (S278). It is presumed that the following is found:

$TMP$-PARENT $\leftarrow A$ sentence 1

...

$X \leftarrow TMP1$ sentence 2

...

$Y \leftarrow TMP2$ sentence 3

If there is no branch path between the above-mentioned partial references (sentence 2, sentence 3), this can be deleted (yes of S279). Therefore, effective setting portions are found other than the sentence 1 tracing back the flow (S280) like the processing of (A) ahead of the partial reference places.

When the following three conditions hold for them; i.e., (1) There is no other reference place than the above partial references for the setting places;

(2) There is no reference to/setting of variables and variables that structurally include data thereof on the left side of the substitution sentence at reference places on the paths from the setting places to the reference places;

(3) It is certain to arrive at the reference places from the setting places; then the place (sentence 1) for setting the temporary variable is substituted by the following setting rows (S281 to S283).

X→upper 5 digits of A sentence 1'-1

Y→lower 3 digits of A sentence 1'-1

Other setting places are substituted likewise. The partial reference places (sentence 2, sentence 3) are deleted (S284).

Furthermore, reference/set information of the basic blocks and symbol table is updated (S285) to reflect reference/set relation of variables that are changed.

The substitution and deletion are not effected when the above-mentioned conditions of substitution are not satisfied.

(6) Natural language conversion unit

The natural language conversion unit 220 is a means which substitutes a natural language (e.g., Japanese) for the interim expression erased by the temporary variable erasing unit 219 based on information of the dictionary 216. The dictionary 216 is a data dictionary for the data names to be substituted by the description of a natural language (e.g., Japanese).

The data dictionary 216 stores the data names and their Japanese names as shown below.

TABLE 2

| Data name | Japanese name |
|---|---|
| ZPCDIN | Input zip code |
| ZPCDOUT | Output zip code |

The natural language conversion unit 220 makes reference to the data dictionary 216 and replaces the interim expression from which the temporary variables are erased by the expression of a natural language one sentence by one sentence according to the conversion rules described below.

TABLE 3

| Pattern of interim expression | Output Japanese form |
|---|---|
| Substitution (variable) (formula 1) | Set (Japanese form of formula 1) to (Japanese names of variables) |
| Conditional branch (condition) | When (Japanese form of condition) |
| (THEN portion) | (Japanese form of THEN portion) |
| (ELSE portion) | In other cases (Japanese form of ELSE portion) |

FIG. 34 is a diagram of specifications formed by using the program shown in FIG. 21, and the natural language conversion unit 220 output specifications as shown, for example, in FIG. 34.

According to the first embodiment of the present invention as will be obvious from the foregoing description, the variables are classified into categories by utilizing the rules of naming variables or the data structure of variables, and a set of substitution sentences having variables of the same kind substituted for the destination is picked up and is converted into a table. Furthermore, when the variables corresponding to the destinations of substitution in the converted consecutive tables are of the same kind, these tables are synthesized into one table to automatically form the specifications. Therefore, the same substitution processings having the same meaning in the specifications can be converted into one table, making it possible to form specifications which are easier to understand.

According to the second embodiment of the present invention, furthermore, the temporary variables used in the program are erased as much as possible making it possible to form specifications while erasing temporary variables that should not appear in the specifications. It is thus allowed to automatically form the specifications maintaining higher quality than that of the specifications formed by the prior art.

We claim:

1. A method, implemented by a computer, of automatically forming program specifications by converting a program into a natural language, the program including sentences and variables, the sentences having destinations with variables of the program substituted for the destinations, the substituted variables being referred to as destination variables, and the method comprising:

classifying the variables of the program into different categories based upon rules for classifying variables;

grouping, into a set, sentences having destination variables classified into the same category;

converting the set of sentences into a table; and converting the table into a natural language.

2. A method of automatically forming program specifications according to claim 1, wherein the program includes rows of sentences which are part of a conditional branch, the step of grouping sentences comprises grouping, into the set, sentences of the rows of sentences having destination variables classified into the same category, and the step of converting the set of sentences into the table comprises classifying the rows of sentences in accordance with branching conditions of the conditional branch and converting the classified rows of sentences into a table.

3. A method of automatically forming program specifications according to claim 2, wherein the program includes sentences which are part of a conditional branch and sentences which are not part of a conditional branch, the step of grouping sentences comprises grouping, into a first set, sentences which are not a part of a conditional branch and which have destination variables classified into the same category, grouping, into a second set, sentences which are part of a conditional branch and have destination variables classified into the same category, and the step of converting the set of sentences into a table comprises converting the first set of sentences into a first table, converting the second set of sentences into a second table, and merging the first and second tables into a combined table.

4. A method as in claim 1, converting a program having variables into a natural language, wherein the classifying step classifies the variables of the program into different categories based upon data attributes of the variables.

5. A method of automatically forming program specifications according to claim 4, wherein the program includes rows of sentences which are part of a conditional branch, the step of grouping sentences comprises grouping, into the set, sentences of the rows of sentences having destination variables classified into the same category, and the step of converting the set of sentences into the table comprises classifying the rows of sentences in accordance with branching conditions of the conditional branch and converting the classified rows of sentences into a table.

6. A method of automatically forming program specifications according to claim 5, wherein
the program includes sentences which are part of a conditional branch and sentences which are not part of a conditional branch,
the step of grouping sentences comprises
grouping, into a first set, sentences which are not a part of a conditional branch and which have destination variables classified into the same category,
grouping, into a second set, sentences which are part of a conditional branch and have destination variables classified into the same category, and
the step of converting the set of sentences into a table comprises
converting the first set of sentences into a first table,
converting the second set of sentences into a second table, and
merging the first and second tables into a combined table.

7. A method, implemented by a computer, of automatically forming program specifications from a program comprising:
analyzing the program to form syntax structure information and data attribute information;
forming data flow information by analyzing the data flow of the program;
detecting temporary variables included in the program from said data attribute information;
forming data inclusion relation information by analyzing inclusion relation of data from said data attribute information;
judging the role of the temporary variables in the program that are detected based upon said syntax structure information, data attribute information, and erasing said temporary variables when they have a predetermined role; and
forming the specifications by using a natural language from which said temporary variables have been erased.

8. A method of automatically forming program specifications according to claim 7, wherein said predetermined role is to improve the programming efficiency including holding the interim result of computation.

9. A method of automatically forming program specifications according to claim 7, wherein said role of the temporary variables is to use said temporary variables for a type conversion into the natural language by re-defining the data.

10. A method of automatically forming program specifications according to claim 7, wherein said temporary variables having said role are used for dividing data based on a parental relation of data structures.

11. A method of automatically forming program specifications according to claim 7, wherein said temporary variables having said role are used for synthesizing data based on a parental relation of data structures.

12. An apparatus including a computer for automatically forming program specifications from a program comprising:
syntax analyzing means which analyzes the program to form a first interim expression which expresses a syntax structure and data structure attribute;
first interim expression means which holds the first interim expression that is formed by said syntax analyzing means;
expression changing means which changes the expression of the program specifications into a second interim expression based on predetermined information of variables used in the program in the first interim expression in said first interim expression means;
dictionary means having natural language information that corresponds to the second interim expression changed by said expression changing means; and
natural language forming means which forms specifications written in a natural language from said second interim expression by using said dictionary means.

13. An apparatus for automatically forming program specifications according to claim 12, wherein
the program includes sentences and variables, the sentences having destinations with variables of the program substituted for the destinations, the substituted variables being referred to as destination variables, and
the apparatus further comprises
table conversion means which
classifies the variables of the program into different categories based upon rules of classifying variables,
groups, into a set, sentences having destination variables classified into the same category, and
converts the set of sentences into a table.

14. An apparatus for automatically forming program specifications according to claim 12, wherein
the program includes sentences and variables, the sentences having destinations with variables of the program substituted for the destinations, the substituted variables being referred to as destination variables, and
the apparatus further comprises
table conversion means which
classifies the variables of the program into different categories based upon data structures of the variables,
groups, into a set, sentences having destination variables classified into the same category, and
converts the set of sentences into a table.

15. An apparatus for automatically forming program specifications according to claim 12, wherein said expression changing means includes:
data flow analyzing means which analyzes said first interim expression to pick up data flow information;
second interim expression means having a second interim expression obtained as a result of analyzing said data flow analyzing means;
temporary variable detecting means which detects temporary variables used in the program;
data inclusion relation analyzing means which analyzes inclusion relation of data of variables; and
temporary variable erasing means which judges the role of temporary variables in the program detected based on said syntax structure information, data attribute information, data flow information and data inclusion relation information, and erases said temporary variables from said second interim expression when said temporary variables having a predetermined role.

16. An apparatus for automatically forming program specifications according to claim 15, wherein said predetermined role of the temporary variables is to improve the programming efficiency including holding the interim result of computation.

17. An apparatus for automatically forming program specifications according to claim 15, wherein said predetermined role of the temporary variables is to use said temporary variables for the type conversion by re-defining the data.

18. An apparatus for automatically forming program specifications according to claim 15, wherein said temporary variables having said predetermined role are used for the division of data based on a parental relation of data structures.

19. An apparatus for automatically forming program specifications according to claim 15, wherein said temporary variables having said predetermined role are used for the synthesis of data based on a parental relation of data structures.

* * * * *

UNITED STATES PATENT AND TRADEMARK OFFICE
CERTIFICATE OF CORRECTION

PATENT NO. : 5,742,827
DATED : Apr. 21, 1998
INVENTOR(S) : OHKUBO et al.

It is certified that error appears in the above-identified patent and that said Letters Patent is hereby corrected as shown below:

Col. 18, line 7, change "X→A + B" to --X←A + B--.

Col. 19, line 18, change "X→A" to --X←A--;
line 19, change "X→B" to --X←B--;
line 39, change "X→A" to --X←A--;
line 40, change "X→B" to --X←B--;
line 41, change "X→" to --X←--.

Col. 20, line 1, change "X→sixth" to --X←sixth--;
line 64, change "X→TMP + 1" to --X←TMP + 1--.

Col. 21, line 36, change "X→A" to --X←A--.

Col. 22, line 16, change "A←B" to --X←B--.

Col. 23, line 7, change "X→upper" to --X←upper--;
line 8, change "Y→lower" to --Y←lower--.

Col. 24, lines 51-54, delete entirely and replace with the following:

-- 4. A method as in claim 1, wherein the classifying step classifies the variables of the program into different categories based upon data attributes of the variables.--

Signed and Sealed this

Twenty-eighth Day of July, 1998

Attest:

BRUCE LEHMAN

Attesting Officer

Commissioner of Patents and Trademarks